United States Patent [19]

Girgis et al.

[11] Patent Number: 4,812,995

[45] Date of Patent: Mar. 14, 1989

[54] ADAPTIVE KALMAN FILTERING IN FAULT CLASSIFICATION

[76] Inventors: Adly A. Girgis, 103 Briarcliff Rd. Rt. 190 3 Box 78-C, Central, S.C.; Robert G. Brown, Rural Rt. 1 Sky Crest Dr., Ames, Iowa

[21] Appl. No.: 52,603

[22] Filed: May 19, 1987

[51] Int. Cl.⁴ .................... G06F 15/20; G01R 31/08
[52] U.S. Cl. .................... 364/481; 324/512; 361/80; 364/483
[58] Field of Search ............. 364/481, 483, 492, 572, 364/578; 361/80; 324/512, 522, 555; 333/18, 28 R

[56] References Cited

U.S. PATENT DOCUMENTS

| | | | |
|---|---|---|---|
| 4,455,612 | 6/1984 | Girgis et al. | 364/483 |
| 4,472,812 | 9/1984 | Sakaki et al. | 333/18 |
| 4,499,417 | 2/1985 | Wright et al. | 324/522 |
| 4,618,933 | 10/1986 | Vitins | 364/483 |
| 4,638,495 | 1/1987 | Mizoguchi | 333/28 R |
| 4,689,709 | 8/1987 | Isahaya | 364/483 |

OTHER PUBLICATIONS

A. A. Girgis et al., "Modelling of Fault-Induced Noise Signals...", IEEE Trans Power Apps & Sys, Sep. 1983 (PAS 102, #9), pp. 2831-2841.
A. A. Girgis et al., "Application of Kalman Filtering in Computer Relaxing", IEEE Trans Power Apps & Sys, Jul. 1981 (PAS 100, #7), pp. 3387-3397.
A. A. Girgis, "Concepts in Kalman Filtering...", Proc 17th Se Symp on System Theory, Apr. 1985, pp. 16-20.
M. S. Sachdev, "Technique for Estimating Transmission Line...", Paper #86 SM, IEEE Pes Summer Meeting, pp. 371-379.
M. M. Elkateb et al., "A New Approach to High Speed Selection", 2nd Int. Conf. Powersystems, Jun. 1980, pp. 171-176.
T. Sakaguchi, "A Statistical Decision Theoretical Approach to Digital Relaying", IEEE Trans Power Apparatus & Systems, Sep./Oct. 1980.
A. A. Girgis, "New Kalman Filtering Based Digital Distance Relay", IEEE TransPower Apps & Sys, Sep. 1982 (PAS 101, #9), pp. 3471-3480.
A. A. Girgis, "Application of Kalman Filtering in Computer Relaxing", PhD Dissertation Iowa State Univ (Abst only), May 1981.

(List continued on next page.)

Primary Examiner—Parshotam S. Lall
Assistant Examiner—Kevin J. Teska
Attorney, Agent, or Firm—Haverstock, Garrett & Roberts

[57] ABSTRACT

An Adaptive Kalman Filtering scheme for statistically predicting the occurence and type of a fault on a three phase power transmission line. Additionally, estimations of the steady-state postfault phasor quantities, distance protection and fault location information is provided. Current and voltage data for each phase is processed in two separate Adaptive Kalman Filtering models simultaneously. One model assumes that the phase is unfaulted, while the other model assumes the features of a faulted phase. The condition of the phase, faulted or unfaulted, is then decided from the computed a posteriori probabilities. Upon the secure identification of the condition of the phase, faulted or unfaulted, the corresponding Adaptive Kalman Filtering model continues to obtain the best estimates of the current or voltage state variables. Thus, the Adaptive Kalman Filtering model having the correct initial assumptions adapts itself to the actual condition of the phase faulted or unfaulted. Upon convergence of the computed a posteriori probabilities indicative of a faulted phase to highly accurate values, the type of fault is classified and the appropriate current and voltage pairs are selected to compute fault location and to provide distance protection. The voltage models are two state variable Adaptive Kalman Filtering schemes. The model for the current with no fault condition is two state variable, while the model that assumes that the phase is faulted is a three state variable model. Estimation convergence reached exact values within half a cycle and consequently, in the same time fault location was determined.

7 Claims, 11 Drawing Sheets

OTHER PUBLICATIONS

D. T. Magill, "Optimal Adaptive Estmation of Sampled Stochastic Processes", IEEE Trans Automatic Control, Oct. 1965 (AC-10), pp. 434–439.

R. G. Brown, "New Look at the Magill Adaptive Filter . . . ", IEEE Trans Circuits & Sys, Oct. 1983 (CAS30, #10), pp. 765–768.

Adly A. Girgis and Elham B. Makram, "Application of Adaptive Kalman Filtering in Fault Classification Distance Protection, and Fault Location Using Microprocessors", Expected Publication Jun. 1987.

A. A. Girgis and R. Grover Brown, "Application of Adaptive Kalman Filtering in Computer Relaying: Fault Classification Using Voltage Models", IEEE Transactions on Power Apparatus and Systems, vol. PAS-104, No. 5, May 1985, pp. 1168–1177.

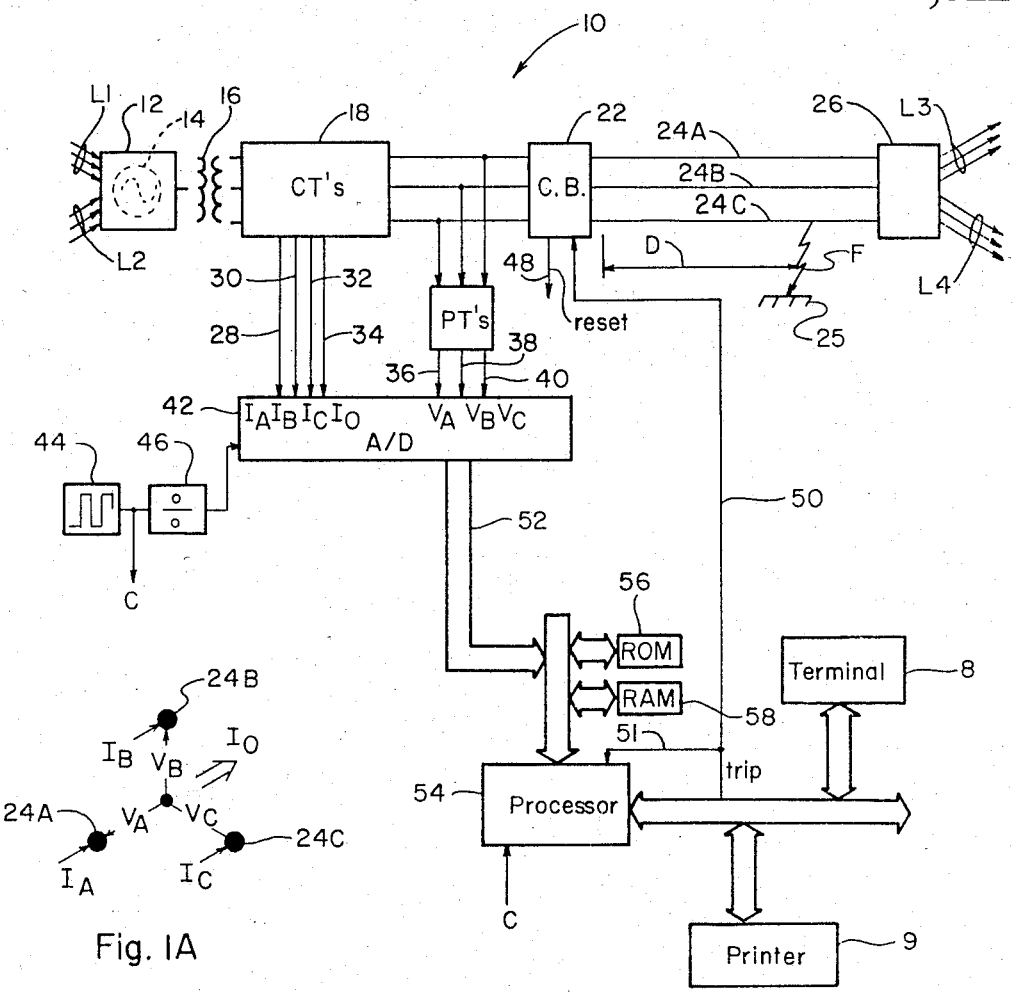
Fig. 1A
Fig. 1
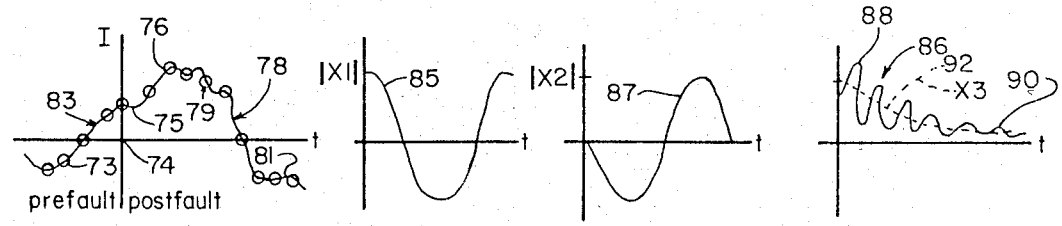
Fig. 1B      Fig. 1C      Fig. 1D      Fig. 1E

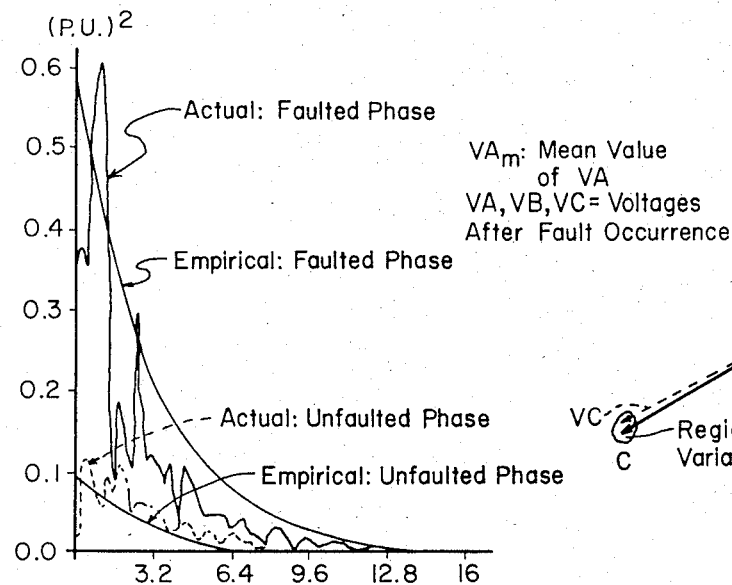
Fig. 3
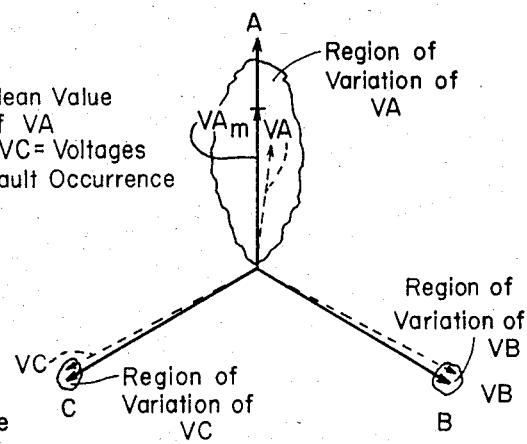
Fig. 4A
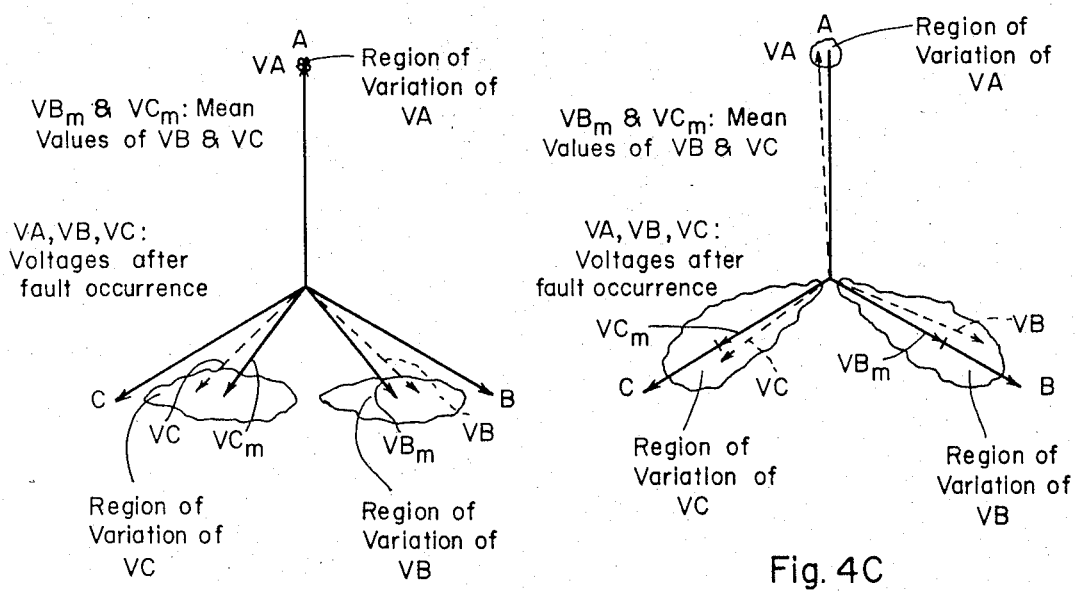
Fig. 4B
Fig. 4C

TABLE I

| Fault | Selected Voltage | Selected Current | Compensating Current $(I_d + jI_q)$ |
|---|---|---|---|
| A-G | VA | $IA + KI_o$ | $I_o$ |
| B-G | VB | $IB + KI_o$ | $I_o$ |
| C-G | VC | $IC + KI_o$ | $I_o$ |
| AB or AB-G | VA-VB | IA-IB | $I_{af} - I_{bf}$ |
| BC or BC-G | VB-VC | IB-IC | $I_{bf} - I_{cf}$ |
| CA or CA-G | VC-VA | IC-IA | $I_{cf} - I_{af}$ |
| 3φ | same as line to line faults. | | |

ADAPTIVE KALMAN FILTERING IN FAULT CLASSIFICATION

BACKGROUND OF THE INVENTION

The present invention relates to the field of digital distance relaying for protecting an AC electric power transmission line system from faults. More specifically, the present invention relates to a statistical technique for estimating steady-state 60 Hz phasor quantities and classifying the type of fault using Adaptive Kalman Filtering Techniques.

In the field of electrical power engineering, generating systems for producing the electric power are interconnected in a complex power grid by high voltage alternating current (AC) three-phase electric power transmission lines. Occasionally, a transmission line is faulted when a conductor wire breaks and falls to the ground or when conductors short-circuit together. The power grid is therefore provided with circuit breakers for disconnecting a faulted section of transmission line. When properly controlled by a distance-relaying computer, the faulted section, and only that section, should be swiftly disconnected so as to avoid unnecessary interruptions of service to electric power consumers and prevent a power blackout from extending over an unnecessarily large geographic region.

Electric power systems increasingly employ more expensive, higher capacity generation and transmission equipment involving increasingly higher voltages and currents. This trend in the technology is putting pressure on the art of digital distance relaying to relay the fault as early as possible in the first AC cycle after inception of the fault. Unfortunately, swiftness in relaying a fault has proven to be a priority which competes with the goal of accurately and confidently identifying which transmission line section is the faulted section. A need is evident for a new relaying approach to provide a greater swiftness of relaying with the same accuracy of identification.

A determination of the faulted line impedance is made on the basis of steady-state postfault sinusoidal voltage and current information. The steady-state would be available several cycles after the postfault noise transient has decayed. However, the sooner accurate impedance calculations can be made, the sooner the faulted line section can be identified. Thus, it is necessary to estimate the steady-state information.

There presently exist various methods for estimating the steady-state 60 Hz phasor quantities. They are classified generally as being deterministic, statistical or semi-statistical/semi-deterministic. To date statistical approaches for fault classification have been relatively rare in the computer relaying area of power systems largely due to the inherent inaccuracies present in the initial models due to the statistical averaging used to develop them. Also problems exist because the computational processes provide excessively large computer burdens, certain types of faults can not be classified and fault classification is based on postfault data and thus necessarily requires the fault to actually occur before relaying is possible.

One of the more successful methods of steady state phasor estimation and digital distance relaying is disclosed in Girgis et al U.S. Pat. No. 4,455,612 which issued June 19, 1984 and is assigned to applicant's assignee. In U.S. Pat. No. 4,455,612 Kalman Filtering modeling techniques are employed to develop an accurate state variable model for the signal to be estimated, a precise model for the fault induced noise (fault induced transients), and appropriate initial conditions to optimally estimate the 60 Hz phasor quantities recursively. The patented system operates by successively sampling the line voltage and current waveforms to detect the inception of a fault. After the fault occurs, postfault voltage and current samples continue to arrive successively. As the samples arrive they are used to recursively electronically update the initial waveform estimate including the desired steady-state sinusoids before the next sample arrives for that voltage or current to be estimated. When a prescribed accuracy has been reached a determination of the faulted line impedance based on the estimated steady-state postfault sinusoidal voltage and current information is made.

Although the patented system provides accurate and fast estimates of the 60 Hz phasor quantities for computer relaying, speed and accuracy are somewhat limited by the utilization of postfault data samples and because the Kalman filtering based technique considers just one model for both faulted and unfaulted phases to account for the frequency of occurence of the different types of faults. An additional disadvantage of the Kalman filtering technique of the patented system is the inability of the filter models to self correct and adapt to actual line conditions.

SUMMARY OF THE INVENTION

The present invention is described as an improvement to the patented method and apparatus described in U.S. Pat. No. 4,455,612. The present invention recognizes that a method of estimating the steady-state postfault voltage and current sinusoids can begin using prefault data as soon as the first sample becomes available. This is achieved by accurately modeling the discriminative features of the current and voltage data in a Kalman filtering scheme which is self learning and adapts itself to correct initial assumptions. Thus, in brief, the present invention is an Adaptive Kalman Filtering scheme for the estimation of the 60 Hz phasor quantities, fault type identification, distance protection and fault location.

In operation of the present invention, seven continous signals representing the line currents and voltage, i.e. the individual three-phase line currents, the residual current and the individual three-phase voltages are supplied by current and voltage transducers to the fault detection system where they are simultaneously sampled, held and converted into digital form by seven independent channels of an analog to digital converter. After digitizing, a fault detection routine compares the latest sample of the three line currents with the corresponding sample one cycle earlier to detect an abnormality in the line currents associated with a fault occurence. Upon detecting a disturbance, each of the three line currents and the three line voltages are processed simultaneously in separate Kalman Filter schemes. Each scheme includes two Adaptive Kalman filter models. One model assumes the features of a faulted phase condition existing on the line while the other considers the features of an unfaulted phase condition existing on the line. During this processing two weight factors $p(\alpha_1|z_k)$ and $p(\alpha_2|z_k)$ are calculated with each new measurement to account for the new sample information; and, as the measurement sequence progresses, the weight factor associated with the filter with the correct hypothesis faulted or nonfaulted approaches unity. Thus, the filter is self-learning and adapts itself to the correct hypothesis as time progresses. Thus, the term $p(\alpha_1|z_k)$ identifies the computed a posteriori probability that a sampled phase is faulted and the term $p(\alpha_2|z_k)$ identifies the computed a posteriori probability that a sampled phase is not faulted. In the present invention when the term $p(\alpha_1|z_k)$ reaches, for example, a value of 0.99 from both the current and voltage models of a particular phase, the phase is identified to be faulted.

In general, the optimal estimate of the waveform state vector is obtained as follows:

$$\hat{X}_k = p(\alpha_1|Z_k)\hat{X}_k(\alpha_1) + p(\alpha_2|Z_k)\hat{X}_k(\alpha_2)$$

which includes estimates from the fault assuming and non-fault assuming filters. However, when the phase is classified to be faulted, only the corresponding fault assuming model will continue processing the data, while the other model, assuming no fault will stop. The computational burden of the processing system is then greatly reduced. As soon as the faulted phase is securely and doubly classified using the current and voltage data, the algorithm selects the appropriate voltage and current pairs to compute the apparent impedance to the fault.

The voltage models of the present invention are two state variable for the Adaptive Kalman filter scheme. The model for the current with no fault conditions is two-state variable, while the model that assumes that the phase is faulted is a three state variable. Accurate models and initial conditions are determined based on the discriminative features of the current and voltage data for the adaptive scheme. These features are (1) the difference in the statistical properties of current and voltage noise in a faulted phase from an unfaulted phase; (2) the correlation of the mean values of the magnitude of the current and voltage of a faulted phase and unfaulted phase with prefault conditions; and (3) the difference in initial covariance matrices for faulted and unfaulted phases.

The Adaptive Kalman Filter models that are utilized in the present invention are based on Magill's estimator as described in R. G. Brown, "A New Look at the Magill Adaptive Filter as a Practical Means of Multiple Hypothesis Testing," *IEEE Transaction on Circuits and Systems*, Vol. CAS-30, No. 10, Oct. 1983, pp. 765–768. The contents of which is incorporated herein by reference. In this estimator, the unknown parameter is assumed to be a discrete random variable with a finite number of possible realizations. This is well suited to the relaying problems because the phase can only be in one of two conditions, faulted or unfaulted. The solution then is to have two parallel Kalman filter models operating on the measurement sequence simultaneously and to determine which condition is correct and thus a more accurate estimate of the state variable. As will become more apparent hereinafter, the processing means of the present invention preferably includes microprocessors programmed to monitor the current samples to detect transmission line abnormalities, to initiate and perform the recursive Kalman filter calculations, to determine the probability of fault and thus the fault classification, to estimate the current or voltage phasors and to compute fault zone and fault location.

OBJECTS OF THE INVENTION

In light of what has been discussed hereinabove, it will be appreciated that a principal object of the present device is therefore to provide a means and method for estimating the 60 Hz phasor quantities, fault type identification, distance protection and fault location.

It is a further object of the present device to provide a means and method for ascertaining the existence of a fault based on computed a posteriori probabilities.

A still further object of the present device is to provide a faster means and method for ascertaining the existence of a fault utilizing pre-fault data samples.

A still further object of the present device is to provide a means and method of ascertaining the existence of a fault utilizing Adaptive Kalman Filter techniques.

A still further object of the present invention is to provide a means and method of ascertaining the existence of a fault which is self learning and adapts itself to correct initial hypotheses.

A still further object of the present invention is to provide a means and method for classifying the type of fault existing on the line.

It is a further object of the present invention to provide means and apparatus for estimating steady-state phasor quantities.

BRIEF DESCRIPTION OF THE DRAWINGS

These and other objects and advantages of the present invention will become apparent after considering the following detailed specification in conjunction with the accompanying drawings, wherein:

FIG. 1 is an electrical block diagram of the digital distance relaying and fault locator system in a preferred embodiment according to the invention;

FIG. 1A is an electrical diagram illustrating the voltage and current transmission line electrical quantities measured in the three-phase system of FIG. 1.

FIG. 1B is an electrical current-versus-time graph of an example of prefault and postfault current in a faulted phase of the transmission line.

FIG. 1C is a current-versus-time graph of the cosine wt component of postfault current having an amplitude corresponding to the magnitude of a state variable X1.

FIG. 1D is a current-versus-time graph of the negative sine wt component of postfault current having an amplitude corresponding to the magnitude of a state variable X2.

FIG. 1E is the current-versus-time graph of the transient component of postfault current wherein the transient is regarded partly as a decaying-exponential current corresponding to the state variable X3, the rest of the transient being regarded as noise having a decaying exponential variance.

FIG. 3 is a RMS prefault voltage-versus-time graph of actual prefault voltage noise characteristic samples for faulted and unfaulted phases and empirical data for the same faulted and unfaulted phases;

FIG. 4A is a diagram illustrating relative post-fault voltage phase relationships for a single phase to ground fault;

FIG. 4B is a diagram illustrating relative post-fault voltage phase relationships for a line to line fault;

FIG. 4C is a diagram illustrating relative post-fault voltage phase relationships for a three phase to ground fault.

DESCRIPTION OF THE PREFERRED EMBODIMENT

Figure 2:
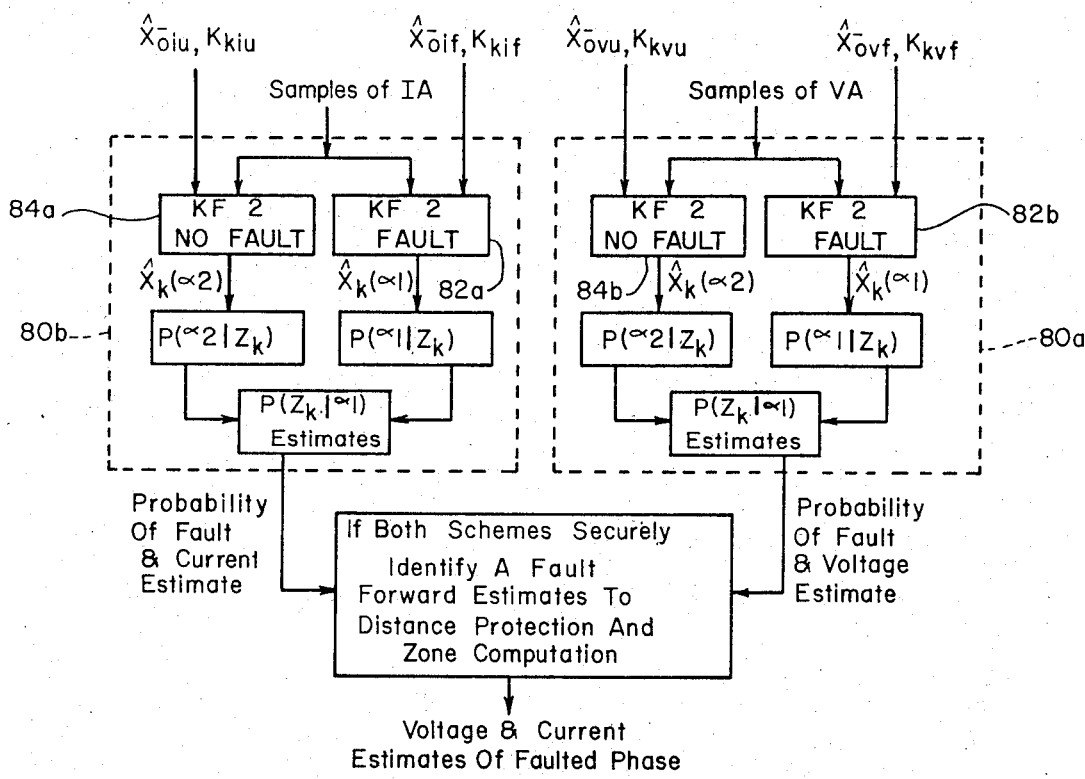
FIG. 2 is a general block diagram of the computational steps of the Adaptive Kalman Filtering Scheme utilized in the preferred embodiment of the present invention.

The present invention is an improvement to the recursive steady-state voltage and current phasor estimation method and apparatus disclosed in Girgis U.S. Pat. No. 4,455,612 and is particularly adaptable for use in the patented system. It is recognized that the engineering of computer systems is presently such that the person skilled in the art is capable of making the appropriate modifications to the patented system in view of the present inventive method to accomplish desired transfers of information and calculations in such systems, in accordance with the present disclosure. Therefore the detailed description herein is provided so as to detail the operations to be performed so that the skilled worker can prepare the system accordingly. Therefore, the Figures and accompanying descriptions in U.S. Pat. No. 4,455,612 are incorporated herein by reference. It should be noted that in the present application numbers in parentheses to the right of each equation is an equation reference number.

Referring now to FIG. 1 more particularly by reference numbers, number 10 refers to a digital relay and fault locator incorporating teachings of the present invention. In FIG. 1, a power grid includes 3-phase transmission lines $L_1$ and $L_2$ joined to 3-phase transmission lines $L_3$ and $L_4$ by 3-phase transmission line 24. Line 24 has three conductors 24A, 24B, and 24C. Line 24 is protected by the inventive digital relay and fault locator 10.

Network 12 includes all electrical equipment to the left of transformer 16 in FIG. 1 as well as the lines $L_1$ and $L_2$; and network 12 is regarded as an equivalent circuit including an equivalent generator 14. Network 12 delivers electric power to transformer 16, line 24, and network 26. Network 26, in turn, includes all electrical equipment to the right of line 24 on FIG. 1 as well as lines $L_3$ and $L_4$; and network 26 is regarded as an equivalent circuit including an equivalent load impedance, not shown.

When a fault F occurs at a distance D along line 24, line 24 must be swiftly disconnected from network 12 by means of 3-phase circuit breaker (C.B.) 22. Current transformers (CTs) 18 and potential (voltage) transformers (PTs) 20 are provided for current and voltage monitoring purposes respectively on line 24 behind C.B. 22.

FIG. 1A illustrates the electrical voltages and currents of interest on 3-phase line 24 as provided by the CTs 18 and PTs 20. Conductors 24A, 24B, and 24C respectively carry phase currents $I_A$, $I_B$, and $I_C$ and have respective potentials, or voltages, $V_A$, $V_B$, and $V_C$ with respect to neutral N of the 3-phase system. A zero-sequence current $I_0$, which is one-third of the sum of the phase currents, is suggested on FIG. 1A. In normal operation the three phase voltages are sinusoids, sine waves, which are equal in amplitude and 120 degrees out of phase each to each. Similarly, the phase currents are normally also sinusoids of equal amplitude and 120 degrees out of phase each to each, and the zero-sequence current is negligible or zero.

The CTs 18 provide analog waveforms corresponding to currents $I_C$, $I_0$, $I_A$, and $I_B$ at terminals 28, 30, 32, and 34, respectively. The PTs 20 provide analog waveforms corresponding to voltages $V_A$, $V_B$, and $V_C$ at terminals 36, 38, and 40 respectively. The provisions for the CTs 18 and the PTs 2 are of a standard type ordinarily available at the stationhouse and familiar in the art.

Although faults, which are electrical accidents in the line 24, are rare, several types of faults can occur. Among faults, the most commonly occurring type is the single-line-to-ground fault F suggested in FIG. 1. Conductor 24C has snapped and fallen to the ground 25, or an insulator has electrically failed. A fault is a form of short circuit, causing line voltage to be more or less loaded down and line current to dramatically rise in steady-state amplitude within a few cycles. Less-common faults (not shown, but contemplated in the inventive relaying system are line-to-line faults such as a line 24C and 24B short circuit), line-to-line-to ground faults, and 3-phase faults (all lines shorted together).

When the line 24 is faulted, at least one of the line currents, suggested as sinusoidal prefault wave 83 of FIG. 1B, is substantially disrupted in shape as at part 79 of postfault wave 78. Samples, such as 76 are taken of the postfault wave 78 as sampling 73 of prefault wave 83 continues after the onset or inception 75 of fault F. Postfault wave 78 assumes a sinusoidal shape of greater amplitude and, in general, different phase only much later, as after wave part 81.

The task of relaying a faulted transmission line 24 is to send a TRIP signal on line 50 to C.B. 22 of FIG. 1 very quickly, and preferably in about half of an AC cycle (8 milliseconds at 60 Hz.) or less, so as to protect expensive equipment in network 12 and transformer 16. The fault must be relayed so soon only if the fault has occurred on the transmission line 24 and not in lines $L_1$, $L_2$, $L_3$, or $L_4$ which are separate zones or sections which are to be separately protected by their own relaying equipment, not shown. The information needed to make the determination of whether or not to trip the C.B. 22 is contained in the steady-state sinusoidal shape of the postfault waveforms which the postfault voltages $V_A$, $V_B$, and $V_C$ and currents $I_A$, $I_B$, $I_C$, and $I_0$ assume after a few cycles. Unfortunately, the waveforms are disrupted by noise and transients during the first cycle after the fault. The inventive system is able to confidently predict according to the inventive method the steady-state components of the postfault waveforms early in the very first postfault cycle, however, and thus determines whether a fault must be cleared by tripping C.B. 22 immediately.

In FIG. 1 the analog inputs for $I_A$ and $I_B$, $I_C$ and $I_0$; and for $V_A$, $V_B$, and $V_C$ are provided to the sample-and-hold analog-to-digital conversion unit 42 as shown. 8 MegaHertz clock multivibrator 41 is fed to digital frequency divider circuit 43 which provides sampling pulses of very short duty cycle at 1920 Hertz (a sampling rate of 32 samples per cycle at 60 Hertz) to simultaneously cause sampling of every analog input $I_A$, $I_B$, $I_C$, $I_0$, $V_A$, $V_B$, and $V_C$ every 520 milliseconds at 60 Hz. Unit 42 suitably has a seven sample-and-hold circuits for simultaneously sampling $I_A$, $I_B$, $I_C$, $I_0$, $V_A$, $V_B$, and $V_C$ followed by an analog-to-digital converter circuit for making the conversion of the samples to digital form and multiplexing onto bus 52 to the Processor 54. It is to be understood that in this embodiment all samples of the electrical quantities, 7 of them, are taken simultaneously, and the sampling is repeated at the rate of 32 samples per cycle under the sole control of the frequency divider 43 output and without any control being exercised by the Processor in the system, as to the instant of sampling. Also, in this embodiment the sampling rate is held at 1920 Hz. regardless of whether the actual prefault system frequency has departed slightly from the nominal 60 Hz.

The Processor is called a Sampling and Supervisor Processor in the present work because it parallel-processes the digital sampling data provided to it on bus 52. When a fault occurs Processor 54 calculates real-time estimations of the state variables of the postfault waveforms of $I_A$, $I_B$, $I_C$, $I_0$, $V_A$, $V_B$, and $V_C$. Processor 54 is provided with a read-only-memory (ROM) 56 and a random-access memory (RAM) 58. Processor 54 is also called a Supervisory Processor herein because it supervises the interpretation of the state variables estimates, impedance calculations and fault classification, tripping of C.B. 22, and fault locator distance calculation, for example. Processor 54 is also a keyboard terminal 8 and a documentation printer 9.

The Processor is provided with a clock input C so that it is run at the 9 MHz. rate set by clock 44.

The Processor monitors bus 52 for inception of a fault F. When the Processor senses the presence of a fault, it initializes, so that postfault processing can commence.

When and if it is determined the C.B. 22 must be tripped to clear a Zone 1 fault, or fault on transmission line 24, Processor 54 communicates a TRIP signal along line 50 to C.B. 22 and ceases sampling operation.

When the fault F has been cleared and circuit breaker 22 is reset, a reset signal provided in standard manner from C.B. 22 is conducted along reset line 48 to the Processors.

The Processor continually monitors and keeps a table of the most recent two cycles of prefault data in RAM 58. ROM 56 and RAM 58 are suitable 64K work memories with 16 bits per word, although the skilled worker should in any event provide the memory capacity which the system being designed requires.

Processor 54 is suitably a stationhouse general purpose computer or minicomputer or microcomputer.

It is recognized that the engineering of computer systems is presently such that the person skilled in the art is sophisticated in making the appropriate arrangements to accomplish desired transfers of information and calculations in such systems, and the detailed description herein is provided so as to detail the operations to be performed so that the skilled worker can prepare the system accordingly.

Each of the voltages $V_A$, $V_B$, and $V_C$ and the currents $I_A$, $I_B$, $I_C$ and $I_0$ is regarded for the present purposes as having a cosine component 85, as shown in FIG. 1C, and a negative sine component 87, as shown in FIG. 1D. The state variable X1 and X2 for each of the voltages and currents are real number multipliers of the components 85 and 87 respectively. State variables X1 and X2 are estimated and refined in estimate, successively beginning with the inception of fault F and upon receipt of each successive postfault sample.

The magnitude of state variable X1 is the amplitude of the cosine component 85, and the magnitude of X2 is the amplitude of the negative sine component 87. X1 and X2 are each able to independently have any real number value being positive, negative, or zero. From a statistical point of view, each state variable X1 and X2 is regarded as an independent random variable with a Gaussian statistical distribution having zero mean.

The choice of components 85 and 87 as cosine and negative sine advantageously permits state variables X1 and X2 to also be identical to the real and imaginary parts of the steady-state complex number phasor representation of each voltage and current. The phasor representation, it will be appreciated, is directly applicable in making postfault impedance and distance D calculations.

It is readily demonstrated that the state variables X1 and X2 are the real and imaginary parts of the corresponding phasor when components 85 and 87 are the cosine and negative sine respectively. Let the phasor be the counterclockwise phase $Ae^{j\phi}$. The real and imaginary parts of the phasor are given by the identity $$Ae^{j\phi} = A\cos\phi + jA\sin\phi \qquad (1)$$

where A is the amplitude of the voltage or current at hand, $\phi$ is its phase angle, and j is the square root of $-1$.

The function of time to which the phasor corresponds is by convention taken as the real part of the phasor product with $e^{+jwt}$, where t is time in seconds and w is radian frequency (377 radians per second at 60 Hz.). Accordingly, $$Re(Ae^{j\phi} \cdot e^{jwt}) = Re(Ae^{j(wt+\phi)}) = A\cos(wt+\phi) \qquad (2)$$

When the just-stated real part is expanded by the trigonometric identify for the cosine of the sum of two angles, the result is $$A\cos(wt+\phi) = (A\cos\phi)\cos wt + (A\sin\phi)(-\sin wt) \qquad (3)$$

The state variable X1 is by definition the multiplier $A\cos\phi$ of the coswt component of the time function; and state variable X2 is similarly, be definition the multiplier $A\sin\phi$ of the negative sine component of the time function of Equation (3). It is evident therefore, by comparison of Equation (3) with Equation (1) that X1 and X2 are the real and imaginary parts of the phasor as well.

For each of the currents $I_A$, $I_B$, $I_C$ and $I_0$ a third component 86, as shown in FIG. 1E, is recognized. FIG. 1E illustrates that in respect of the currents a substantial transient 86 is observed which appears to be a noisy decaying exponential function of time, in addition to the quadrature sinusoidal components 85 and 87 of FIGS. 1C and 1D. A state variable X3, which as shown in FIG. 1E is a decaying exponential function of time, is selected in the present work. The initial value of this decaying exponential function to be estimated can be any positive, negative, or zero real number, illustrated as positive in FIG. 1E. The departure of current transient 86 from state variable X3 (curve 92) is noisily large at initial portion 88 and becomes small later at latter portion 90. The departure is regarded as noise having an exponentially decaying variance.

As stated earlier herein, Processor 54 of the present inventive method performs Adaptive Kalman Filtering, i.e., recursive estimation, in filter schemes which are self learning and which adapt their initial conditions in real time to the actual condition of each phase of the line, faulted or unfaulted.

The present system simultaneously processes voltage and current data samples in two separate Kalman Filter schemes indicated generally by numbers 80a and 80b in FIG. 2. Each scheme includes two Adaptive Kalman Filter models which are self learning to adapt their recursive estimations to computed real time conditions based on computed a posteriori probabilities imputed to the system. These a posteriori probabilities are determined from actual three phase transmission line experiments. The present system analyzes line data samples and, based on the computed probabilities determines which type of line abnormality would cause such a result. Adaptive Kalman Filter models 82a and 82b are modeled to assume the conditions of faulted phases and models 84a and 84b are modeled to assume the conditions of unfaulted phases existing on the power transmission line.

In order to adequately detail the operation of the present Adaptive Kalman Filter schemes and their modeling requirements it is necessary to briefly review general Kalman Filter techniques.

Kalman Filter Mathematics

Kalman Filtering has been used extensively in many applications, and is discussed in detail in references such as A. Gelb, APPLIED OPTIMAL ESTIMATION, MIT Press, 1974, and R. G. Brown, *Introduction To Random Signal Analysis and Kalman Filtering*, Wiley, 1983. This method of filtering is especially well suited to on-line digital processing because the noisy input (measurement) data is processed recursively. The filter is initialized with an initial estimate of the signal and its error covariance. Then as each measurement sample becomes available in real time it is used to update or refine the filter's previous estimate. In the usual situation where the system is observable, the coarse initial estimate is successively improved as more measurement data become available until, eventually, a steady-state condition is reached where no further improvement is obtained. In the implementation of a Kalman Filter, a mathematical model of the signals to be estimated is assumed to be of the form $$X_{k+1} = \phi_k X_k + w_k \qquad (4)$$

Equation (4) is the state model for the process to be estimated where $X_k$ is the $n \times 1$ process state vector at time $t_k$ $\phi_k$ is the $n \times n$ state transition matrix $w_k$ is an $n \times 1$ vector uncorrelated sequence with known covariance structure.

The observation (measurement) of the process is assumed to occur at discrete points in time in accordance with the relationship $$Z_k = H_k X_k + v_k \qquad (5)$$

where $Z_k$ is the $m \times 1$ vector measurement at $t_k$ $H_k$ is the $m \times n$ matrix giving the ideal (noiseless) connection between the measurement and state vector $X_k$ $V_k$ is the $m \times 1$ measurement error—assumed to be an uncorrelated sequence with known covariance structure.

The covariance matrices of the $w_k$ and $v_k$ vectors are given by $$\overline{w_k w_i^T} = \begin{cases} Q_k, & i = k \\ 0, & i \neq k \end{cases} \qquad (6)$$

$$\overline{v_k v_i^T} = \begin{cases} R_k, & i = k \\ 0, & i \neq k \end{cases} \qquad (7)$$

$$\overline{w_k v_i^T} = 0, \text{ for all } k \text{ and } i. \qquad (8)$$

Having an a priori estimate $\hat{X}_k^-$ and its error covariance $P_k^-$ the recursive Kalman Filter equations are as follows:

1. Compute the Kalman Gain $K_k$:

$$K_k = P_k^- H_k^T (H_k P_K^- H_K^T + R_k)^{-1} \quad (9)$$

2. Update estimate with measurement $Z_k$:

$$\hat{X}_k = \hat{X}_k^- + K_k(Z_k - H_k \hat{X}_k^-) \quad (10)$$

3. Compute error covariance for updated estimate:

$$P_k = (I - K_k H_k) P_k^- \quad (11)$$

4. Project ahead $$\hat{X}_{k+1}^- = \phi_k \hat{X}_k \quad (12)$$

$$P_{k+1}^- = \phi_k P_k \phi_k^T + Q_k \quad (13)$$

The foregoing is a generalized mathematical statement of the Kalman Filter. The description of how to apply the theory in the context of the present invention is more fully described herein and hereinafter.

To discriminate between the features of a faulted phase and an unfaulted phase it was necessary to empirically study and model:

1. The difference in the statistical properties of current and voltage noise in a faulted phase from an unfaulted phase.
2. The correlation of the mean values of the magnitude of the current and voltage of a faulted phase and unfaulted phase with prefault conditions.
3. The difference in initial convariance matrices for faulted and unfaulted phases.

The results of this study are detailed in

A. A. Girgis, "Application of Kalman Filtering in Computer Relaying of Power Systems," Ph.D. Disertation, Iowa State University, Ames, Iowa, May 1981.

A. A. Girgis and R. G. Brown, "Modeling of Fault-Induced Noise Signals for Computer Relaying Applications," *IEEE Transactions on Power Apparatus and Systems*, Vol. PAS 102, No. 9, 1983, pp. 2834–2841. The contents of which are incorporated herein by reference and are discussed hereinafter.

The study was based on the autocorrelation function, variance, and frequency spectrum of the fault-induced transients considering the probability of fault location and the frequency of occurrence of the different types of faults.

Statistical Properties of the Current and Voltage Noise
Current Noise

A detailed study of the autocorrelation function and the variance of current noise in the faulted phase suggested that this noise should be modeled as the sum of two components. The first is a random exponential process, that may be described in a state variable discrete form as:

$$x3_{k+1} = e^{-B\Delta t} \cdot x3_k + w_k \quad (14)$$

The second component is a white sequence with an exponentially decreasing variance. An empirical formula for this variance is $$RIF_k = (\tfrac{1}{2})\sigma_{if}^2 e^{k\Delta t/T_1} \quad (15)$$

Examining the autocorrelation function and the variance of current noise in an unfaulted phase suggests that the current noise in an unfaulted phase may be considered as a white sequence with a decreasing variance. An empirical formula for this variance may be expressed as $$RIU_k = \sigma_{iu}^2 \cdot e^{-k\Delta t/T_1} \quad (16)$$

where, $\sigma_{if}^2$ is the variance of the current variation in a faulted phase $\sigma_{iu}^2$ is the variance of the current variation in an unfaulted phase due to a fault

Voltage Noise

Examining the autocorrelation function, variance and frequency spectrum of the voltage noise suggested that the voltage noise should be modeled as a white sequence with an exponentially decreasing variance as shown in FIG. 3. Thus the variance of the voltage noise signal in the faulted and unfaulted phases can be expressed as $$RVF_k = \sigma_{vf}^2 \cdot \sigma e^{-k\Delta t/T_1} \quad (17)$$

$$RVU_k = \sigma_{vu}^2 \cdot \sigma e^{-k\Delta t/T_1} \quad (18)$$

where, $\sigma_{vf}^2$ is the variance of the sending end voltage variation of a faulted phase due to a fault on the line $\sigma_{vu}^2$ is the variance of the voltage variation of an unfaulted phase due to a fault The fault dependent parameter in the noise characteristic is the initial variance of the noise. For a typical power system, this initial variance was found to be 0.6 per unit square (PU$^2$) for a faulted phase and 0.1 PU$^2$ for an unfaulted phase. It should be mentioned here that the RMS value of the perfault voltage is considered to be one per unit. Thus equations 14 and 15 can be rewritten as $$RVF_k = 0.6 e^{-k\Delta t/T_1} \quad (19)$$

$$RVU_k = 0.1 e^{-k\Delta t/T_1} \quad (20)$$

The statistical average of the parameters $T_1$ and $B$ can be empirically obtained using the following formula.

$$T_1 = \tfrac{1}{2} \frac{L_1 \cdot l}{R_1 \cdot l + R_F}, \beta = 1/T_1 \quad (21)$$

where $L_1$ and $R_1$ are the positive sequence inductance and resistance per mile of the line to be protected.

$R_F$ is the average expected fault resistance.

$l$ is the length of the line in miles.

Change of the Current and Voltage Phasor Quantities Due to a Fault

When a fault occurs in a high voltage transmission line, the voltage, at the sending or receiving end, of the faulted phase(s) collapses relative to the voltage of the unfaulted phase(s). In a three-phase fault, the voltages collapse symmetrically. Other phase faults are characterized by the relative collapse of two of the phase to neutral voltages, compared to the relatively normal third phase to neutral voltage. For a single-line-to-ground fault, one phase to neutral voltage collapses relative to the other two phases. On the other hand, the current in the faulted phase(s) experiences larger changes than the current in the unfaulted phases. There are many parameters that affect these changes such as fault location, fault resistance, source impedence, untransposition, configuration, etc. Some of these parameters are random in nature and the others are system dependent. Therefore, the magnitude of the collapsed voltage and altered current after fault occurrence may be defined in terms of a mean value and a variance. To obtain an accurate intial process vector, the variation of the 60 Hz components of the voltages and currents were examined. The results of this study are summarized here.

Consider, for example, a single line to ground fault or a three-phase fault, the collapsed voltage may vary between a very small value for a close-in fault to a relatively large value for a remote fault. In case of line-to-line or double-line-to-ground fault, the voltage of the faulted phase may vary between 50% of prefault voltage to a value slightly less than prefault voltage. The change in phase angle is also random in nature but with a zero mean. To produce numerical values for testing, a typical power system that includes a 160-mile transmission line was considered. The probability of fault location was assumed to be uniform and a typical fault resistance was assumed. The values obtained for the mean value of the collapsed voltage of the faulted phase and the change of the voltage of the unfaulted phase are shown in FIGS. 4A, 4B and 4C for different types of fault. As a result, the mean value of voltage of the faulted phase may be considered to be between 0.65–0.75 of the prefault voltage while the mean value of the voltage of the unfaulted phase is the prefault voltage. The variance of the voltage is represented by the shaded area of FIGS. 4A, 4B, and 4C. Numerically, the variance of voltage is considered to be approximately 0.1 and 0.0025 PU$^2$ for faulted and unfaulted phases respectively. Similarly, current analysis shows the mean value of the current in the unfaulted phase is equal to the prefault current. The mean value and the variance of the current and voltage in the faulted phase can be obtained from well known fault analysis techniques. The mean value of the magnitude of the current in the faulted phase is found to be approximately equal to the square root of twice the variance of the current in the faulted phase.

Furthermore, as power systems are dominantly inductive, the mean current in the faulted phase lags the prefault voltage by an angle $\theta_{mean}$. An average value for $\theta_{mean}$ is found to be about 60°.

The average phase variation of the voltage is found to be zero. It is important to note here that the mean values and variances discussed above depend on the length of the line and the source impedances.

The above principles were implemented to obtain the required initial process vector and initial covariance matrices for the Adaptive Kalman Filters described herein.

PARAMETERS OF KALMAN FILTER MODELS FOR FAULTED AND UNFAULTED PHASES

Voltage Models

State and Measurement Equations:

The state transition matrix for equation (1) is the same for both faulted and unfaulted phases. therefore, the state model of both voltage filters may be written as follows:

$$\begin{bmatrix} x1 \\ x2 \end{bmatrix}_{k+1} = \begin{bmatrix} 1 & 0 \\ 0 & 1 \end{bmatrix} \begin{bmatrix} x1 \\ x2 \end{bmatrix}_k \quad (22)$$

According to equation (5) the measurement equation for both faulted and unfaulted phases may be expressed as $$z_k = [\cos(\omega_o k \Delta t), -\sin(\omega_o k \Delta t)] \begin{bmatrix} x1 \\ x2 \end{bmatrix}_k + v_k \quad (23)$$

The Kalman filter model which assumes that the phase is faulted differs from the model that assumes the phase to be unfaulted in the initial covariance matrix, noise variance, and initial process vector. These parameters can be summarized as follows:

Initial Process Vectors and Their Error Covariance Matrices Faulted phase

The initial process vector for the voltage model assuming the phase to be faulted is taken as the mean value of the voltage considering uniform distribution for fault location. This may be described as $$\hat{X}_{ovf}^- = C_o \cdot \text{prefault voltage} \quad (24)$$

The corresponding initial covariance matrix can be described as $$\overline{P}_{ovf} = C_p \begin{bmatrix} \sigma_{vf}^2 & 0 \\ 0 & \sigma_{vf}^2 \end{bmatrix} \quad (25)$$

where, $C_o$ and $C_p$ are constants that depend on the parameters of the line to be protected and source impedance.

Unfaulted Phase

As previously disclosed hereinabove, the initial process vector for the voltage model assuming the phase to be unfaulted is taken as the prefault voltage vector, i.e., $$\hat{X}_{ovu}^- = \text{prefault voltage vector} \quad (26)$$

The associated initial covariance matrix may be described as $$\overline{P}_{ovu} = \begin{bmatrix} \sigma_{vu}^2 & 0 \\ 0 & \sigma_{vu}^2 \end{bmatrix} \quad (27)$$

The noise variance for the voltage models are taken as described by equations (17) and (18).

Current Models

State and Measurement Equations

The representation of the current in the faulted phase requires three state variables. Two states to represent the in-phase ($x_1$) and quadrature-phase ($x_2$) components. The third state variable represents the exponentially decaying current (dc offset). However, the current in the unfaulted phase requires two state variable only.

Thus the state and measurement equations can be described as follows.

State and Measurement Equation for a faulted phase

State Equations $$\begin{bmatrix} x1 \\ x2 \\ x3 \end{bmatrix}_{k+1} = \begin{bmatrix} 1.0 & 0 & 0 \\ 0 & 1.0 & 0 \\ 0 & 0 & e^{-\beta \Delta t} \end{bmatrix} \begin{bmatrix} x1 \\ x2 \\ x3 \end{bmatrix}_k + \begin{bmatrix} 0 \\ 0 \\ w_k \end{bmatrix} \quad (28)$$

Measurement Equation $$z_k = [\cos(\omega_o k \Delta t), -\sin(\omega_o k \Delta t), 1] \begin{bmatrix} x1 \\ x2 \\ x3 \end{bmatrix}_k + v_k \quad (29)$$

State and measurement equation for an unfaulted phase

State equations $$\begin{bmatrix} x1 \\ x2 \end{bmatrix}_{k+1} = \begin{bmatrix} 1.0 & 0 \\ 0 & 1.0 \end{bmatrix} \begin{bmatrix} x1 \\ x2 \end{bmatrix}_k \quad (30)$$

Measurement Equation $$z_k = [\cos(\omega_o k \Delta t), -\sin(\omega_o k \Delta t)] \begin{bmatrix} x1 \\ x2 \end{bmatrix}_k + v_k \quad (31)$$

Initial Process vectors and their Error Covariance Matrices

Faulted phase

The initial process vector for the current assuming the phase to be faulted, contains three components. The first two components represent the initial process for the in-phase and quadrature-phase components of the noise-free signal. The third component represents the initial process for the random exponential component. The first two components are obtained as follows:

$$\hat{x}_{oif}{}^-(1,2) = I_{scm} \underline{/\theta_v - \pi/3} \quad (32)$$

where, $I_{scm}$ is the mean value of the current in a faulted phase $\theta_v$ is the phase angle of the prefault voltage the third component is taken as the negative of the first as $$\hat{x}_{oif}{}^-(3) = -\hat{x}_{oif}{}^-(1) \quad (33)$$

The error covariance matrix is then found to be $$\overline{P}_{oif} = \frac{1}{2} \begin{bmatrix} \sigma_{if}^2 & 0 & 0 \\ 0 & \sigma_{if}^2 & 0 \\ 0 & 0 & \sigma_{if}^2 \end{bmatrix} \quad (34)$$

Unfaulted Phase:

The initial process vector ($x_{oiu}$) of the current, assuming the phase to be unfaulted, is the prefault current.

The associated initial covariance matrix is then described as $$\overline{P}_{oiu} = \begin{bmatrix} \sigma_{iu}^2 & 0 \\ 0 & \sigma_{iu}^2 \end{bmatrix} \quad (35)$$

ADAPTIVE KALMAN FILTER SCHEME

Thus far, the Kalman filter model parameters $\phi_k$, $H_k$, $R_k$, $Q_k$, $P_o$ and $\hat{X}_o{}^-$ are known for both a faulted and unfaulted phase. However, it is not known if the phase is faulted or unfaulted. This is another random parameter. In such case, it is highly desirable to design the filter to be self-learning, so that it can adapt itself to the situation at hand, i.e., the condition of the phase, faulted or unfaulted. It is known that the probability that the phase is faulted is discrete in nature.

The Adaptive Kalman Filter models that are proposed here are based on Magill's estimator. In this estimator, the unknown parameter was assumed to be a discrete random variable with a finite number of possible realizations. This is well-suited to the relaying problem because the phase can only be in one of two conditions, faulted or unfaulted. The solution then is to have two parallel Kalman Filters operating on the measurement sequence simultaneously as shown in FIG. 2. The problem is to determine which condition is correct and thus a more accurate estimate of the state variable.

The derivation of the Magill Adaptive Filter is adequately represented in references such as R. G. Brown, "A New Look at the Magill Adaptive Filter as a Practical Means of Multiple Hypothesis Testing," *IEEE Transaction of Circuits and Systems*, Vol. Cas-30, no. 10, October 1983, pp. 775–768 so it will not be repeated here. In the adaptive estimator, we will be especially concerned with the $(z_k - H_k \hat{X}_k{}^-)$ term that appears as the difference between the measurement and its predicted value just prior to acquiring the measurement. This is denoted as $(z_k - \hat{z}_k{}^-)$.

Two weight factors $p(\alpha_1 | z_k)$ for the faulted phase filter model and $p(\alpha_2 | z_k)$ for the non-faulted phase filter model are calculated with each new measurement to account for the new information; and, as the measurement sequence progresses, the weight factor associated with the filter with the correct hypothesis approaches unity. Thus the filter is self learning and adapts itself to the correct hypothesis as time progresses.

To calulate the a posteriori probabilities $p(\alpha_1 | z_k)$ and $p(\alpha_2 | z_k)$, two prior conditional density functions are computed first from the recursive equations $$P(z_k | \alpha_i) = \left\{ \frac{1}{(2\pi)^{\frac{1}{2}} (H_k P_k{}^- H_k{}^T + R_k)^{\frac{1}{2}}} \right. \quad (36)$$

$$\left. \exp \left[ -\frac{1}{2} \frac{(z_k - \hat{z}_k{}^{-2})}{(H_k P_k{}^- H_k{}^T + R_k)} \right] \right\} p(z_{k-1} | \alpha_i); \ i = 1,2$$

As the unconditional probabilities $p(\alpha_1)$ and $p(\alpha_2)$ are considered to be equal, then the corresponding a posteriori probabilities are than obtained from $$p(\alpha_i/z_k) = \frac{p(z_k|\alpha_i)}{p(z_k|\alpha_1) + p(z_k|\alpha_2)} \quad i = 1,2 \qquad (37)$$

The recursive form of equation (36) is especially appropriate for the Kalman filter implementation because the measurement residual $(z_k - \hat{z}_k^-)$ and $(H_k P_k^- H_k + R_k)$ are quantities that are normally computed in each of the Kalman filters. The second term is computed off-line. Thus, the computation is relatively simple.

The main objective of the Adaptive Kalman Filter is to provide an optimal estimate of the state vector $x_k$ considering the probability of the different situations. Computation of the a posteriori probabilities is a means to achieve this goal. However, when this technique is used for computer relaying, the a posteriori probabilities become important in classifying the type of the fault. Thus the term $p(\alpha_1|z_k)$ identifies the probability that this particular phase if faulted. When this value reaches 0.99 from both the current and voltage models of this particular phase, the phase is identified to be faulted as shown in FIG. 2. In general, the optimal estimate of the state vector is obtained as $$\hat{x}_k = p(\alpha_1|z_k)\hat{x}_k(\alpha_1) + p(\alpha_2|z_k)\hat{x}_k(\alpha_2) \qquad (38)$$

However, in the present system when the phase is classified to be faulted, only the corresponding model will continue processing the data, while the other model (assuming no fault) will stop. The computation burden will then be greatly reduced. The faulted phase is identified within 4 samples using 16 samples per cycle in all the cases that were tested.

As soon as the fault is securely classified using the current and voltage models, the algorithm selects the appropriate voltage and current pairs to compute the apparent impedance to the fault.

Figure 5:
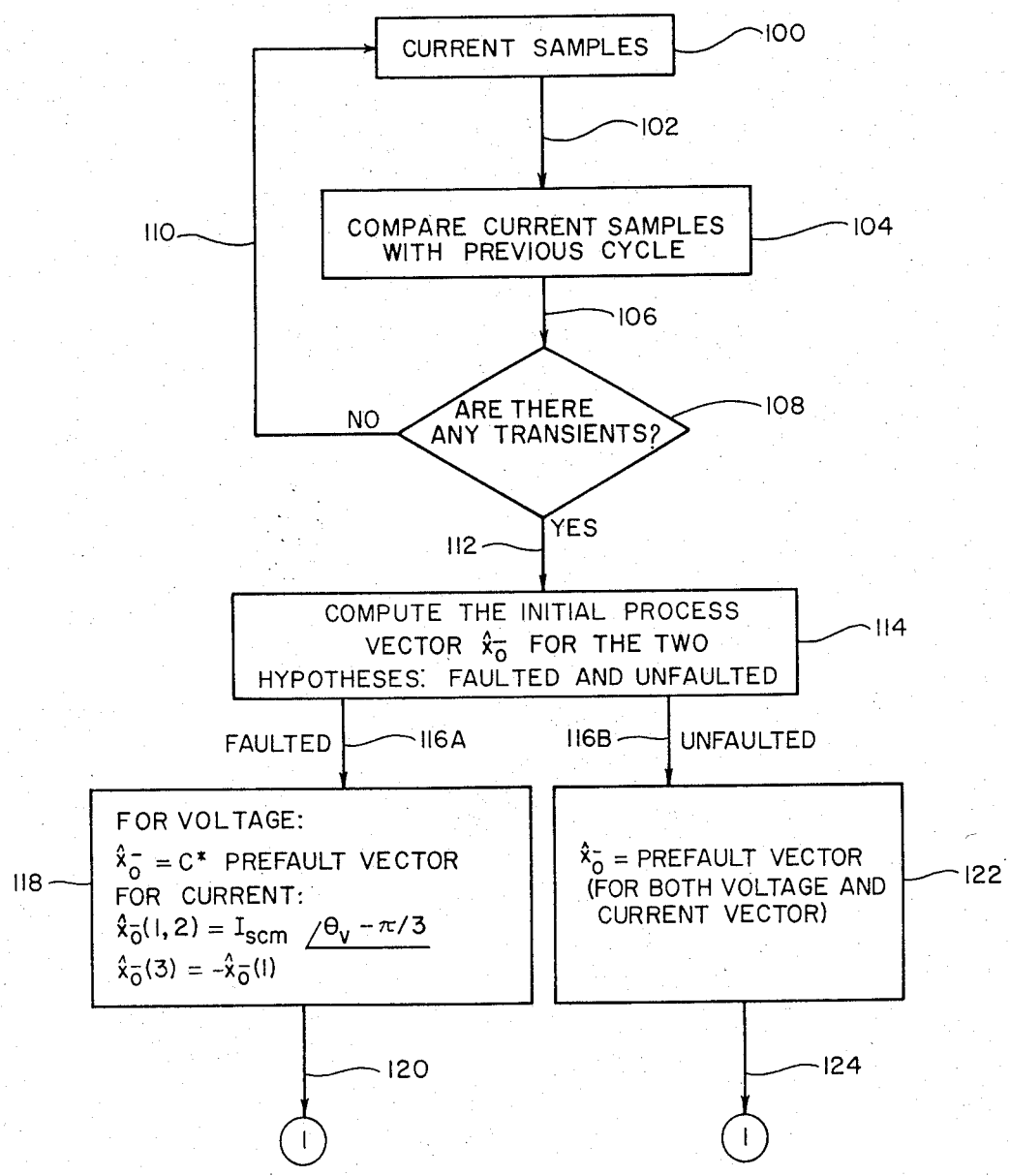
FIGS. 5, 6 and 7 are a continuous flow chart depicting an operational sequence of steps to calculate a faulted phases and voltage and current phasor estimates.
Figure 6:
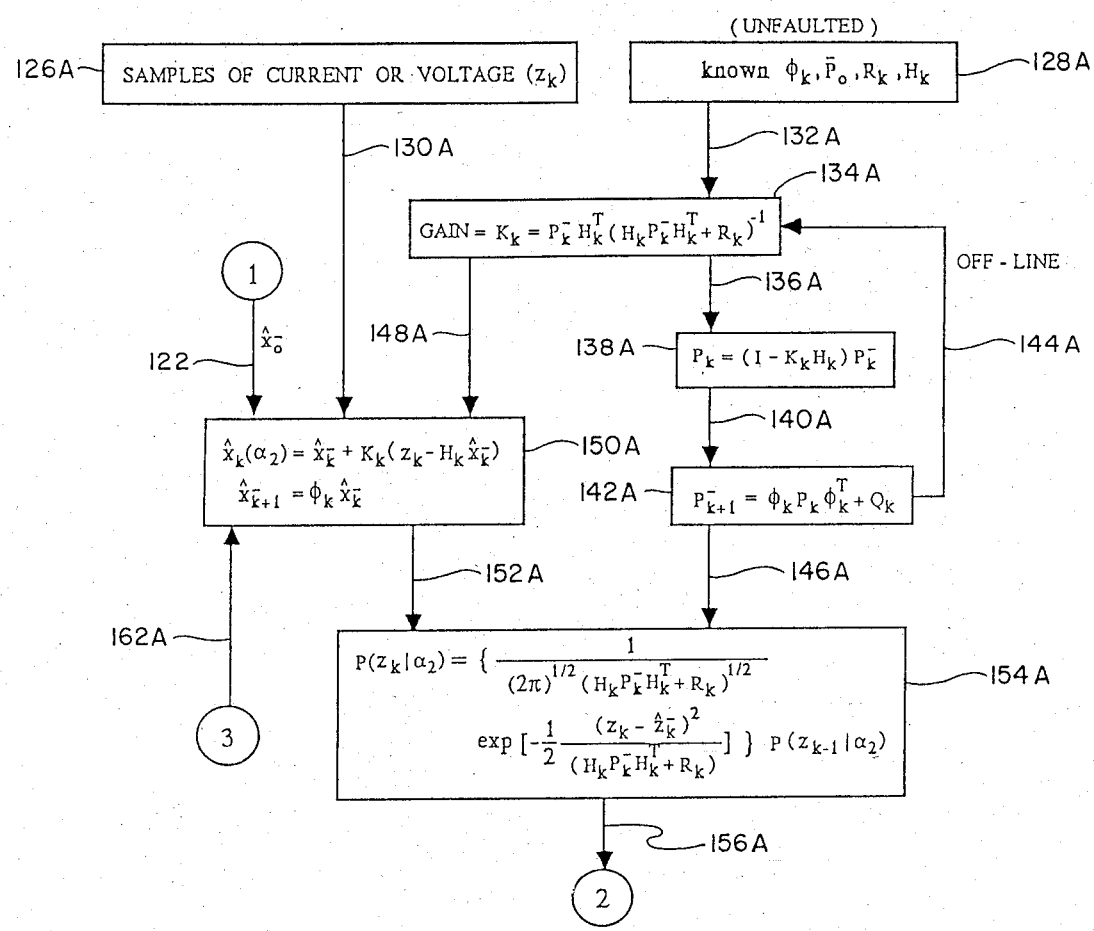
Figure 7:
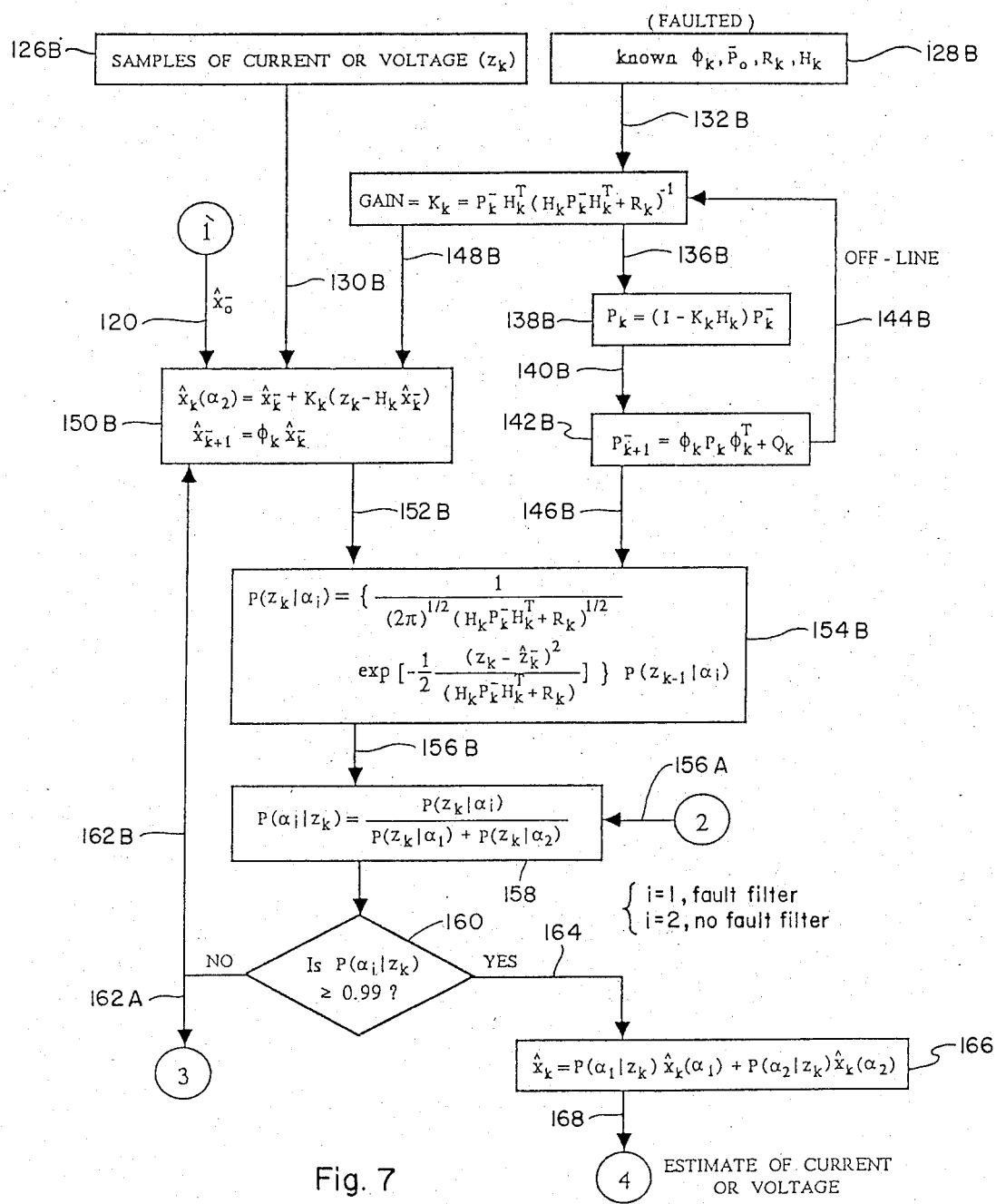

FIGS. 5, 6 and 7 depict a generalized sequence of operation that may be followed by the processor during the recursive calculation of the computed a posteriori probability of fault and the estimate of the corresponding steady-state phasor quantities. The processing enters a looping sequence, as denoted by blocks 100, 102, 104, and 108 and branch 110 in which it awaits receipt of digitized line current samples. The current samples are obtained from the line, digitized and held as described with reference to FIG. 1 earlier herein and supplied to block 100. At block 102 the most recent three line current samples are compared with the current samples obtained one cycle earlier. This comparison step checks for transients which may exist in the most recent sample which were not present in the previous samples. Such transients are usually indicative of a line abnormality such as a fault. If no transients are detected the system loops on 106 and inputs a new set of line current samples at block 100 and repeats the above sequence. If such transients are detected at block 104 the fault detection scheme is initialized by a signal on branch 108 to block 110. At block 110 the initial process vectors for the two Kalman Filters are computed. Process vectors are computed for Kalman Filters assuming a faulted phase block 116 and for an unfaulted phase block 118. These process vectors are supplied via branches 120 and 122 to fault assuming and non-fault assuming Kalman Filters respectively. These initial process vectors are computed as shown at Blocks 116 and 118 for faulted and unfaulted conditions respectively. FIG. 6 shows a general sequence of program steps for the Adaptive Kalman filter models of the present invention for faulted phase assumptions for both voltage and current data samples. Of course distinctions exist in the actual models based on whether current or voltage data is being processed. However, these distinctions as detailed earlier herein exist in the initial conditions and need not be repeated in FIG. 6. Similarly with respect to FIG. 7, a general sequence of program steps for current and voltage data samples in fault assuming Adaptive Kalman filter models is shown. At initiation of the recursive estimation process the four current data samples and three voltage data samples for each phase are inputed into a Kalman Filter assuming a faulted phase 150B and a Kalman Filter assuming a unfaulted phase 150A. Concurrently with the recursive estimation procedure the Kalman Filter Gain is computed off line as described in the patented system of U.S. Pat. No. 4,455,612. For purposes of discussion, only the no-fault Adaptive Kalman Filter scheme using current data will be described. However it should be noted that the respective schemes for both voltage and current data operate similarly and that the relevant discussion of one is applicable to the other. During the recursive procedure for classifying the condition of the phase, two prior conditional density functions are computed for each filter scheme at blocks 154A and 154B. The output of blocks 154A and 154B are inputed to block 158 via branches 156A and 156B for further processing to calculate a weight factor for each initial hypothesis of the condition of the phase, faulted or unfaulted. These weight factors are calculated with each new measurement to account for the new information. As the measurement sequence progresses, the weight factor associated with the filter with the correct hypothesis approaches unity. Thus the filter is self-learning and adapts itself to the correct hyothesis as time progresses. Thus, each weighting factor is the calculated a posteriori determination of the condition of the individual phases. Thus the looping sequence characterized by blocks 150, 154, 156, 160 and loop 162 recursively updates the initial phasor estimates and the computed a posteriori probability i.e., condition of the phase. As the computed a posteriori probability approaches unity the estimation of the steady-state phasor quantity converges toward an accurate value. In a preferred embodiment of the present system convergence to accurate values is considered to occur when the computed probability on each current and voltage data set is greater than or equal to 0.99. When this occurs the a posteriori probability at block 160 and the steady-state phasor estimation at block 166 is transferred to memory means to select the appropriate current and voltage data corresponding to the faulted phase for subsequent impedance and fault zone calculations.

Figure 8A:
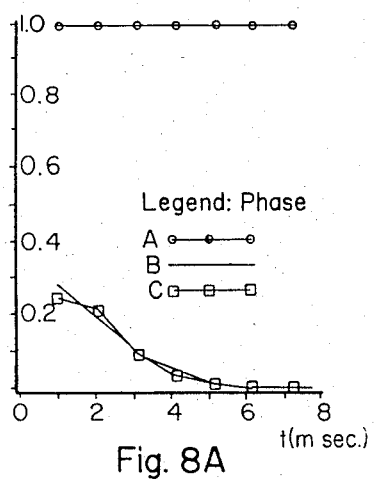
FIGS. 8A, 8B and 8C are probability of fault-versus-time graphs using voltage data showing faulted phase classification times for single phase, double phase and three phase faults respectively.
Figure 8B:
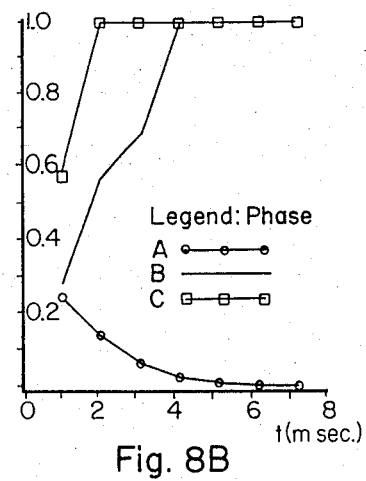
Figure 8C:
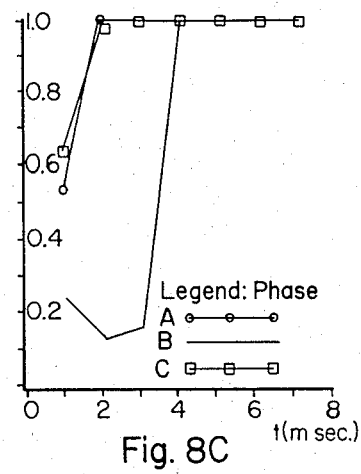
Figure 9A:
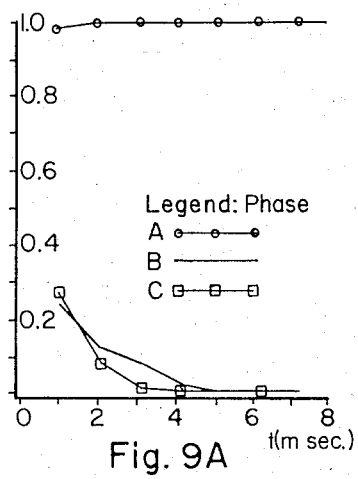
FIGS. 9A, 9B and 9C are probability of fault-versus-time graphs using current data showing faulted phase classification times for single phase, double phase and three phase faults respectively.
Figure 9B:
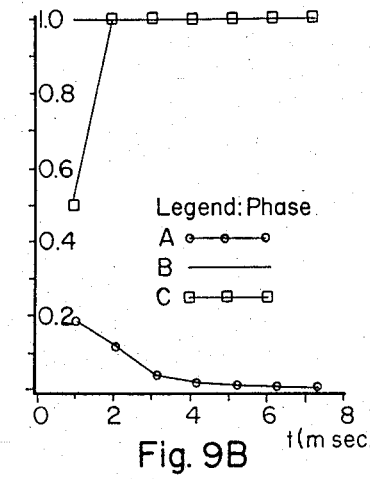
Figure 9C:
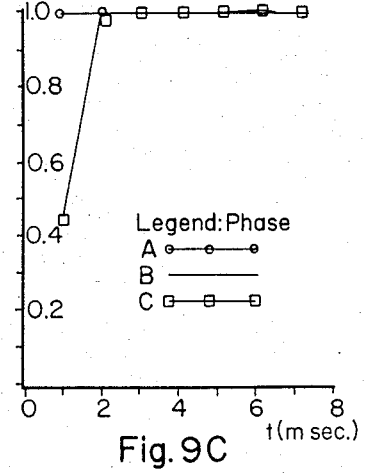
Figure 10A:
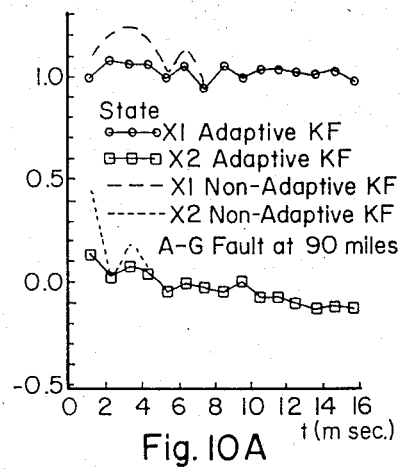
FIG. 10A is an estimated states of voltage phase A-versus-time graph for a single phase VA to ground fault showing time to convergence of voltage state variable estimates and comparing adaptive filtering to non-adaptive filtering.
Figure 10B:
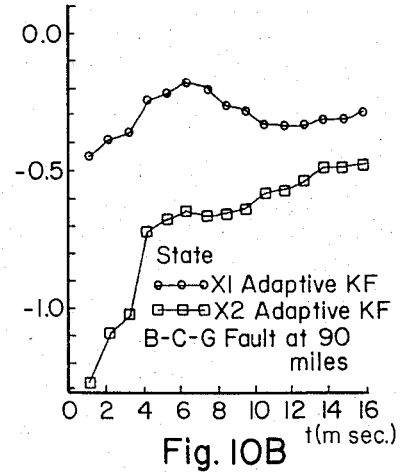
FIG. 10B is an estimated states of voltage phase B-versus-time graph for a twophase VB and VC to ground fault showing time to convergence of voltage state variable estimates using adaptive filtering.
Figure 10C:
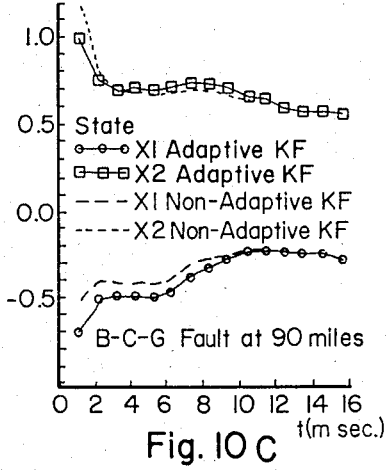
FIG. 10C is an estimated states of voltage phase C-versus-time graph for a two phase VB and VC to ground fault showing time to convergence of voltage state variable estimates and comparing adaptive filtering to non-adaptive filtering.
Figure 11A:
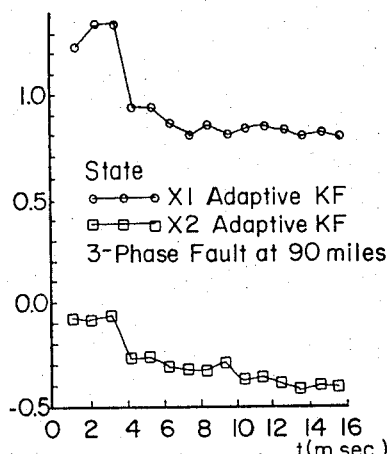
FIGS. 11A, 11B and 11C are estimated states of voltage phases A, B and C respectively-versus-time graphs for a three phase VA, VB and VC to ground fault showing time to convergence of voltage state variable estimates using adaptive filtering.
Figure 11B:
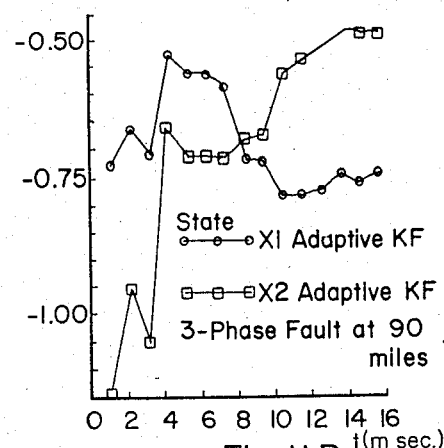
Figure 11C:
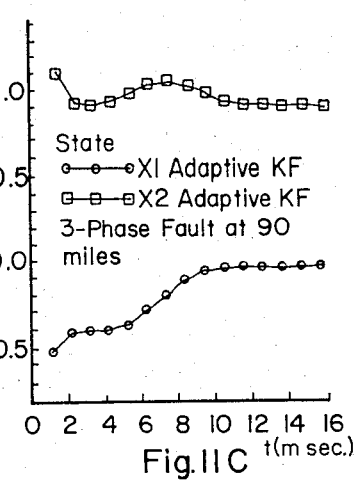
Figure 12A:
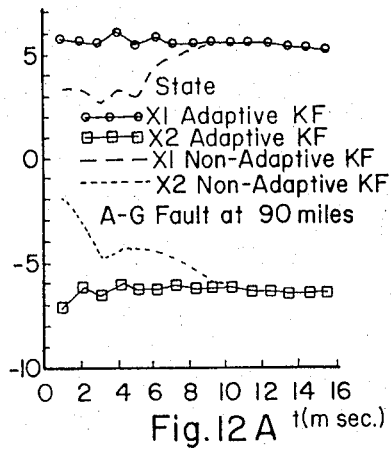
FIG. 12A is an estimated states of current phase A-versus-time graph for a single phase IAS to ground fault showing time to convergence of current state variable estimates and comparing adaptive filtering to non-adaptive filtering.
Figure 12B:
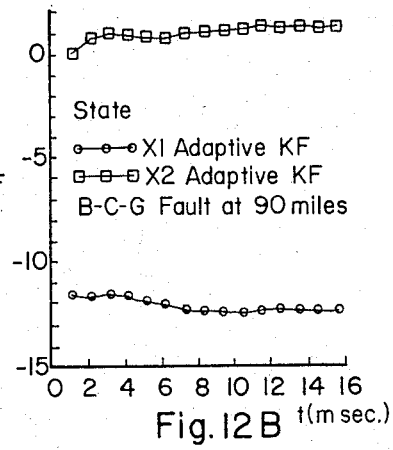
FIG. 12B is an estimated states of current phase B-versus-time graph for a double phase IB and IC to ground fault showing time to convergence of current state variable estimates using adaptive filtering.
Figure 12C:
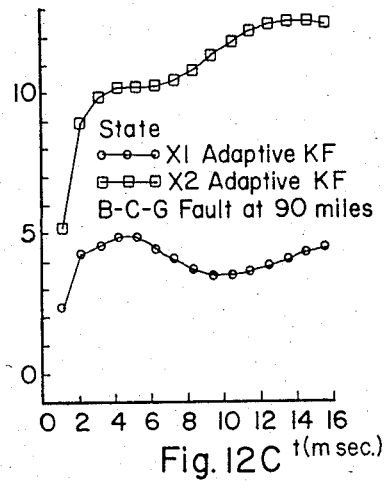
FIG. 12C is an estimated states of current phase C-versus-time graph for a double phase IB and IC to ground fault showing time to convergence of current state variable estimates using adaptive filtering.
Figure 13A:
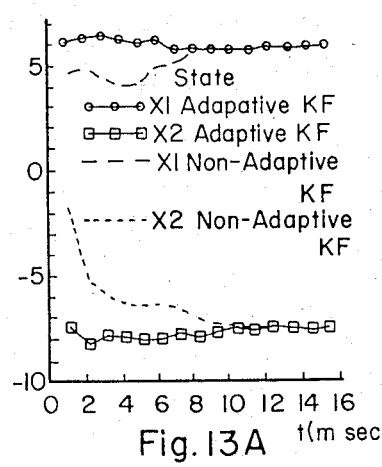
FIGS. 13A, 13B and 13C are estimated states of current phases A, B and C respectively-versus-time graphs for a three phase IA, IB and IC to ground fault showing time to convergence of current state variable estimates using adaptive filtering, FIG. 13A also shows a comparison to non-adaptive filtering.
Figure 13B:
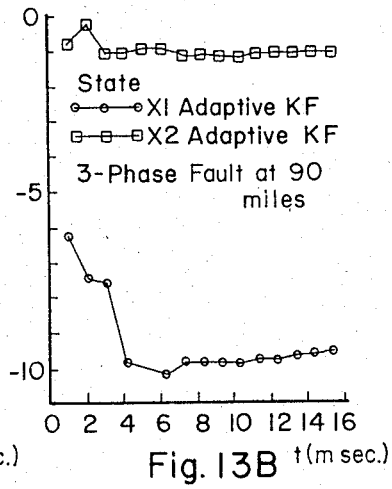
Figure 13C:
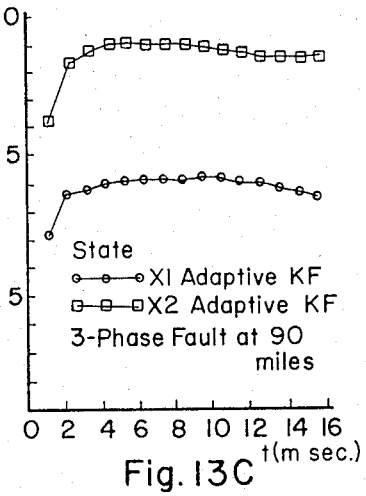
Figure 14:
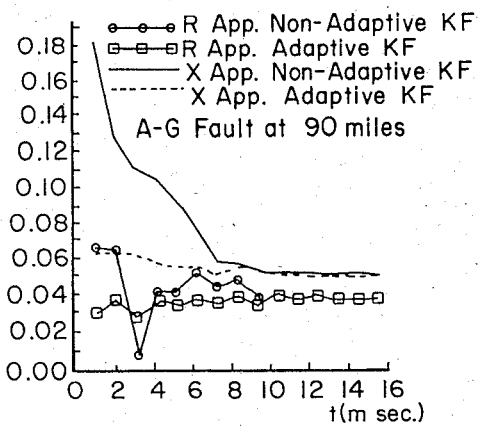
FIG. 14 is an apparent resistance and reactance-versus-time graph showing time to convergence of calculations and comparing adaptive filtering to non-adaptive filtering for a single phase to ground fault.
Figure 15:
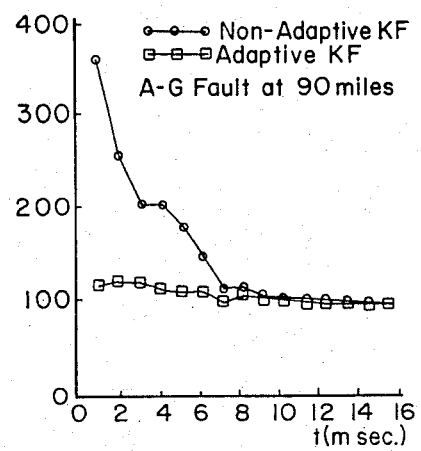
FIG. 15 is a computed fault location-versus-time graph showing time to convergence of calculations and comparing adaptive filtering to non-adaptive filtering for a single phase to ground fault.

The present inventive method was tested with digitally simulated data obtained from an electromagnetic transient program. The program is based on a frequency domain algorithm that considers the frequency dependence of system parameters. All faults were applied at the instant that result in maximimum transients in the current and voltage waveforms. The power system model used for the test consisted of a 160 mile transmission line and an equivalent source on each side. All types of faults were applied at different locations on the line. Pre-fault data and post fault data at different sampling rates were then used for testing the fault detection, fault classification and fault location calculations. Examples of the test results are illustrated in FIGS. 8 and 9. Using a sampling rate of 64 samples per cycle, the fault was classified in less than two milliseconds using the voltage or current models. Using a sampling rate 16 samples per cycle, the maximum fault classification time was 4 milliseconds. As drawings FIGS. 8 and 9 show all single line to ground faults were classified within two samples (two milliseconds at the slower sampling rate). With the present Adaptive Kalman Filtering scheme an optimal estimate of the current and voltage phasors were obtained faster than possible with known Kalman Filter methods. The estimates of the voltage and current state variables converge to the exact values within a quarter of a cycle (using 16 samples per cycle) for a single line in the ground fault cases. For all cases the estimates of the states converge to highly accurate values in less than half a cycle. This convergence is illustrated in FIGS. 10 and 11 for voltage state variables for different types of fault. FIGS. 12 and 13 show the convergence of estimates of the current state variables for different types of fault. FIG. 14 shows a comparison of the convergence of the apparent resistance and apparent reactance calculations for a single line the ground fault using adaptive and nonadaptive schemes. FIG. 15 shows the calculated fault location for the same fault using the adaptive and nonadaptive schemes. These results indicate that both schemes are highly accurate. However, the adaptive scheme converges faster to the correct values.

After the probability of a fault existing has been securely identified and the steady-state current and voltage quantities have been estimated the fault is classified as one of seven types as illustrated in Table 1. The classifications are defined as 1: line A to ground; 2: line B to ground; 3: line C to ground; 4: line A to line B (or both to ground); 5: line B to line C (or both to ground); 6: line A to line C (or both to ground); and 7: line A to line B to line C (or all to ground). Classifications from one to three are regarded as line-to-ground faults, and from 4 to 7 as line-to-line faults.

Figure 16:
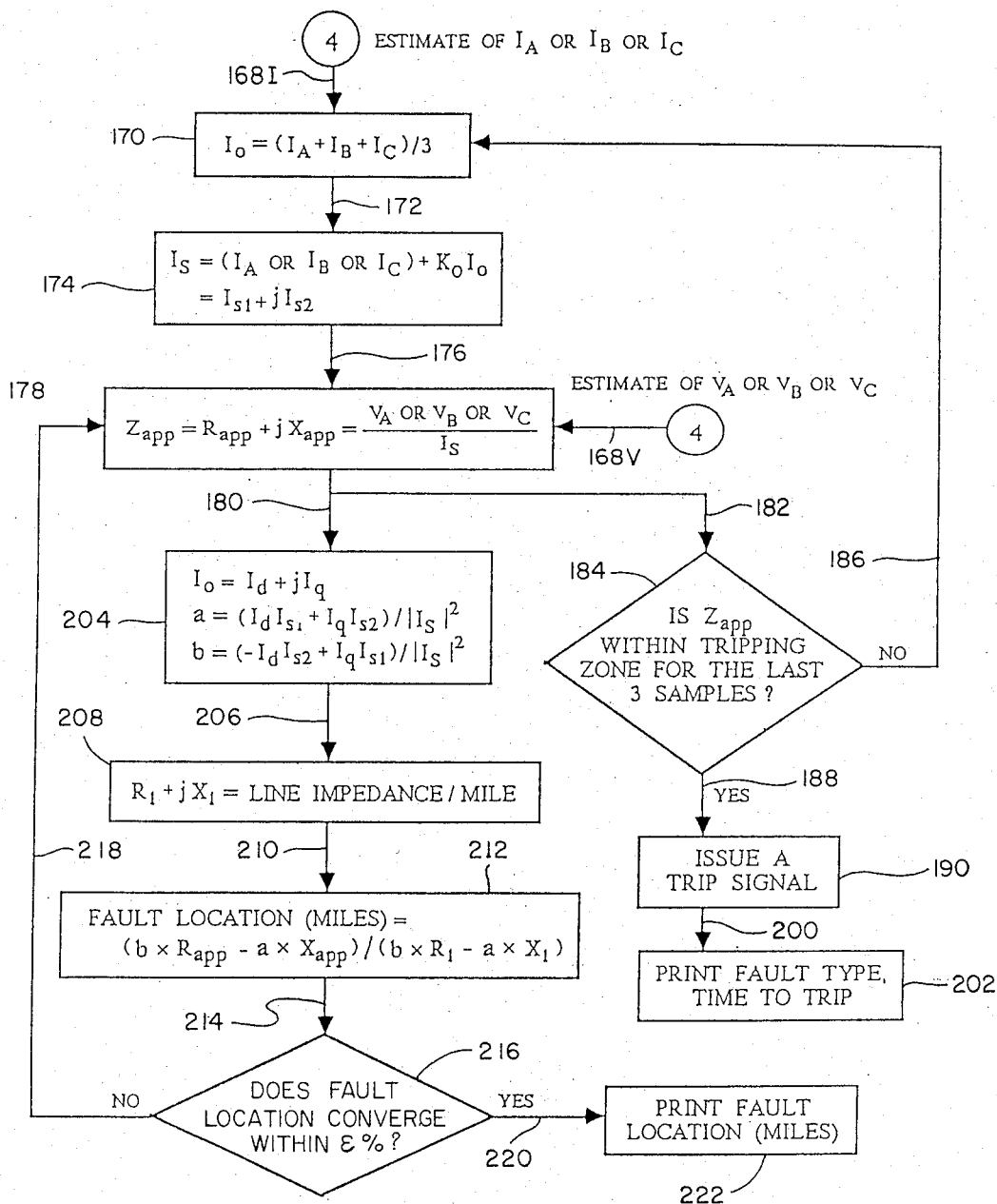
FIG. 16 is a flow chart depicting an operational sequence of steps to calculate fault zone and fault location for a two phase A and B to ground fault.
Figure 17:
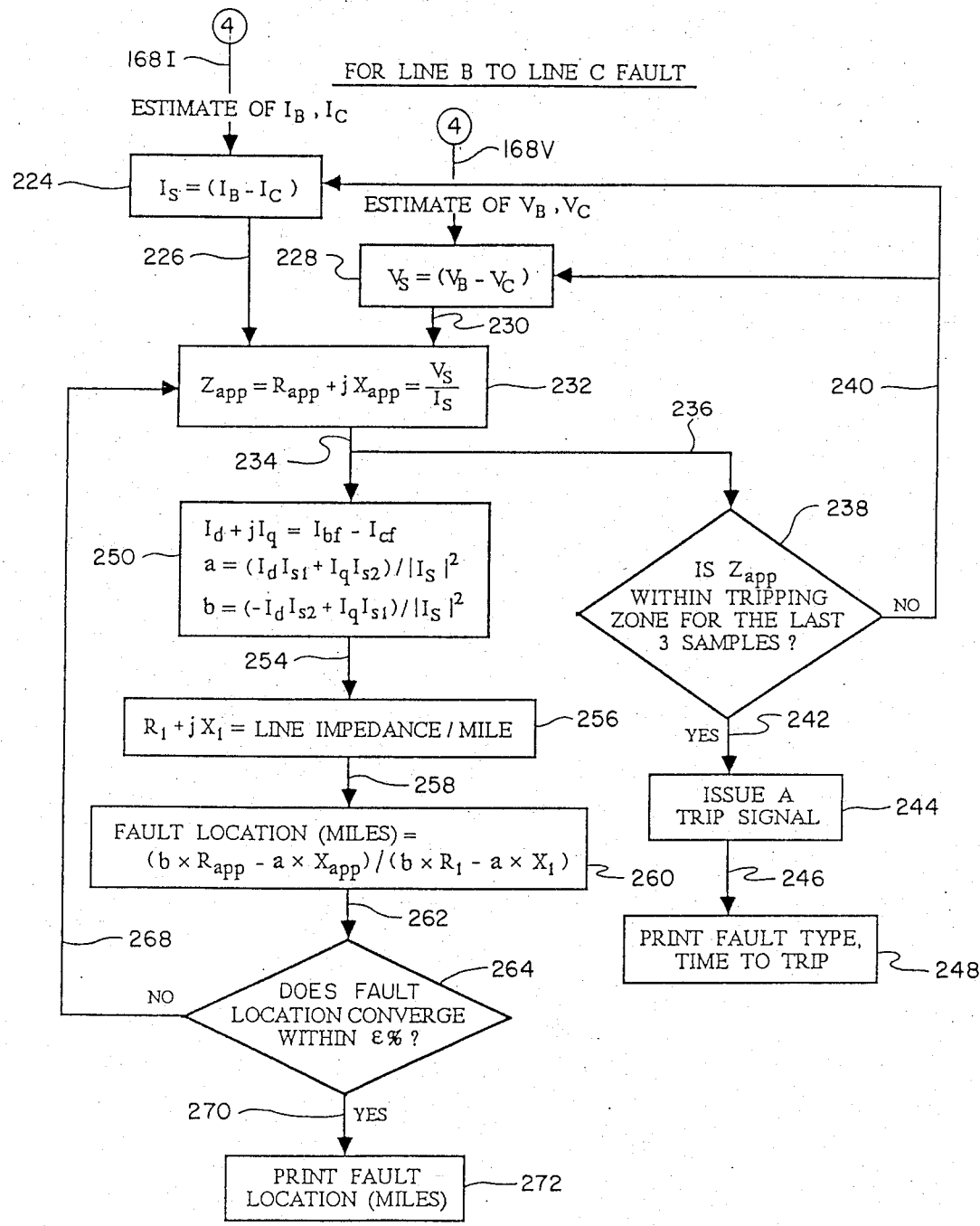
FIG. 17 is a flow chart depicting a operational sequence of steps to calculate fault zone & fault location for a single phase to ground fault.

After the fault has been securely classified from both the current and voltage Adaptive Kalman Filter schemes, the processor program will proceed onto the apparent impedance, fault resistance, fault zone and fault location calculations and fault relaying, if required. FIG. 16 refers to a sequence of operation that may be followed by the processing means of the present invention for a single line to ground fault. FIG. 17 refers to a similar sequence of operation that may be followed for line-to-line and three phase faults.

Referring again to FIG. 16 and Table 1, the program calculates the latest estimate of the phasor for the post-fault zero-sequence current $I_0$ at block 170. $I_0$ for a single line-to-ground fault is the average of the individual phase currents $I_A$, $I_B$, and $I_C$. The calculated value for $I_0$ is inputed to block 174 for use in calculating $I_s$, the current phasor selected for apparent impedance calculations. $I_s$, for a single line-to-ground fault, is the sum of the faulted phase current $I_A$, $I_B$, or $I_C$ and the current $I_F$ of the fault. $I_F$ is not known but is considered proportional to the zero sequence current $I_0$ by a compensating factor $K_0$ where $K_0$ is $(Z_0-Z_1)/Z_1$.

$V_s$, the voltage selected from Table 1, is the voltage phasor $V_A$, $V_B$, or $V_C$ of the faulted phase as determined at block 166 of FIG. 7. The apparent impedance calculated at block 178 is simply the complex ratio of the selected voltage to the selected current or $V_s/I_s$ according to the type of fault and faulted phases, as shown in Table 1. Generally, the selected voltage and current pair may be represented as complex quantities in the form $$V_s = V_{s1} + jV_{s2} \quad (39)$$

$$I_s = I_{s1} + jI_{s2} \quad (40)$$

Then the apparent impedance may be computed at block 178 as $V_s/I_s$ or restated $$Z_{app} = R_{app} + jX_{app} = \frac{V_1 + jV_2}{I_{s1} + jI_{s2}} \quad (41)$$

rationalizing the denominator equation 41 may be rewritten as $$= \frac{V_1 \cdot I_{s1} + V_2 \cdot I_{s2}}{I_{sm}^2} + j \frac{V_1 \cdot I_{s2} + V_2 \cdot I_{s1}}{I_{sm}^2} \quad (42)$$

where $I_{sm}^2 = I_{s1} \cdot I_{s1} + I_{s2} \cdot I_{s2}$

The resistance $R_{APP}$ and reactance $X_{APP}$ of the faulted line apparent to the digital relay 10 of FIG. 1 are thus the real and imaginary parts of the apparent impedance of the line as shown in equation 42. The apparent impedance calculation is part of a looping sequence which includes blocks 178, 204, 208, 212, 216 and loop 218 of FIG. 16 for single line-to-ground faults and the looping sequence including blocks 232, 250, 256, 260, 264 and loop 268 of FIG. 17 for multiple phase faults.

Referring again to FIG. 17, there is shown the sequence of operation for a multiple phase fault and more specifically by way of example, for a phase B to phase C fault. The current $I_S$ selected by the program is the complex difference of the currents of the two faulted phases, identified in this example as $I_B - I_C$. The voltage $V_s$ selected at block 228 is the complex difference of the voltages of the two faulted phases, identified in this example as $V_B - V_C$.

When first calculating the apparent resistance and the apparent reactance seen by the relay, block 178 FIG. 16, block 232 FIG. 17, the fault resistance is neglected. However, this resistance is considered in the subsequent relay zone determinations and the calculation of fault location.

There are various techniques for fault location based on the 60 Hz phasors which can be implemented by the present inventive system. In a preferred technique the fault resistance is compensated for by considering the current fed into the fault. This current $I_F$ is not known, however, it is considered to be proportional to the zero sequence current $I_0$ in the case a single line-to-ground fault, and proportional to the difference between the compensated currents in the faulted phases in the case of multiple faults, as shown in Table 1. The apparent impedance is then modified to be in the form $$Z_{app} = R_{app} + jX_{app} \quad (43)$$
$$= (R_1 + jX_1) \times + \frac{R_F K_F (I_d + jI_q)}{I_{s1} + jI_{s2}}$$

where
$I_d + jI_q$ represents the compensating current.
$R_F$ the fault resistance, and $K_F$ a factor that relates the current in the fault resistance to the compensating current.

Thus, the term $R_F K_F(I_d+jI_q)$ represents the voltage across the arc resistance $R_F$. Rewriting equation 43 in terms of the real and imaginary components leads to $$\begin{bmatrix} R_{app} \\ X_{app} \end{bmatrix} = \begin{bmatrix} R_1 & (I_d I_{s1} - I_q I_{s2})/I_{sm}^2 \\ X_1 & (I_d I_{s2} + I_q I_{s1})/I_{sm}^2 \end{bmatrix} \begin{bmatrix} x \\ K_F R_F \end{bmatrix} \quad (44)$$

From equation 44 the distance to the fault can be expressed as $$X = ((R_{APP})(b) - (X_{APP})(a))/((b)(R_1) - (a)(X_1)) \quad (45)$$

where X in miles, $$a = (I_d I_{s1} - I_q I_s^2)/I_{sm}^2,$$

and $$b = (I_d I_{s2} - I_q I_{s1})/I_{sm}^2.$$

The recursive calculation of the fault location by the program is checked at block 216 to determine if the fault location calculation has converged to a steady-state value. This is decided by comparing the previous calculation with the most recent and if the values are within, for example, 1% of each other the program initiates a "PRINT FAULT LOCATION" signal to block 222. If the fault location calculation does not converge the sequence loops back to block 178 and the apparent impedance seen by the relay is updated. At block 184 of FIG. 16 the program determines if the apparent impedance has been within the tripping danger zone of a particular circuit breaker for the last three samples. If not, the program loops to block 170 to wait for and read the next packets of state variable estimates for the next sample set.

If the impedance has been within the zone for the last three consecutive samples, the program goes to block 190 and sends a "TRIP SIGNAL" on line 50 of FIG. 1 to instruct circuit breaker 22 to trip and a signal on lead 51 to stop the sampling process and await a reset signal on lead 48 from circuit breaker 22. The program then moves to block 202 and prints the fault type and time to trip.

The sequence of program steps for fault location calculations described above with respect to FIG. 16 is equally applicable to FIG. 17 for a line to line fault. Of course $V_s$, $I_s$ and the compensating current will vary as listed in Table 1.

When a three phase fault occurs on the line, accurate impedance and fault location calculations are made by choosing any two of the three line voltages and line currents detailed with respect to FIG. 17.

From all that has been said, it will be clear that there has been shown and described herein a means and method for using Adaptive Kalman Filtering in Fault Classification which fulfills the various objects and advantages sought therefor. It will be apparent to those skilled in the art, however, that many changes, modifications, variations, and other uses and applications of the subject means method for using Adaptive Kalman Filtering in Fault Classification are possible and contemplated. All changes, modification, variations, and other uses and applications which do not depart form the spirit and scope of the invention are deemed to be covered by the invention, which is limited only by the claims which follow.

What is claimed is:

1. A method of digital distance relaying on a three phase electric power transmission system comprising the steps of:
   successively sampling line values from each line of said transmission system, and comparing said values with corresponding sample values taken one cycle earlier;
   electronically detecting an abnormality on said transmission line from a comparison of said samplings;
   recursively electronically processing line current data samples and line voltage data samples of each phase of said transmission line in respective current and voltage Adaptive Kalman filter schemes, each filter scheme including two parallel Adaptive Kalman filter models, one of said Adaptive Kalman filter models assuming features of a fault condition existing on said line and the other Adaptive Kalman filter model assuming features of an unfaulted condition existing on said transmission line, each of said current and voltage Adaptive Kalman filter schemes individually having a probability factor associated therewith indicative of a probability as to whether the respective Adaptive Kalman filter models an actual line condition, when a probability associated with a voltage Adaptive Kalman filter model and a probability associated with a current Adaptive Kalman filter model for a same condition exceed some predetermined value and if said condition is a faulted condition then respective current and voltage waveform sinusoid estimates;
   determining whether said voltage and current waveform sinusoid estimates indicate that said fault lies within a predetermined zone; and
   tripping circuit breaking means for a section of said transmission line corresponding to said zone when said voltage and current waveform sinusoid estimate indicates that said fault lies within said predetermined zone, in automatic response to said determining step.

2. The method of digital distance relaying claimed in claim 1 wherein said Adaptive Kalman filter models line features corresponding with said calculated probability indicative of the condition of the line by processing said line current and line voltage data and adapting themselves to said probabilistic condition, and when an Adaptive Kalman filter model does not correspond with a respective calculated probabilistic condition of the line, said filter discontinues processing.

3. The method of digital distance relaying claimed in claim 1 wherein said voltage Adaptive Kalman filter models have at least two state variables, and said current Adaptive Kalman filter model with no fault conditions has at least two state variables, and said current Adaptive Kalman filter model with fault conditions has at least three state variables.

4. The method of digital distance relaying claimed in claim 3 wherein said two state variables of said voltage models correspond to amplitudes in quadrature, said two state variables of said current model with no fault conditions correspond to amplitudes in quadrature, and said three state variables of said current model with fault conditions correspond to amplitudes in quadrature and a transient wave form component.

5. In a distance relay having circuit breaker means for isolating a fault in one section of an alternating voltage transmission system, sampling means having a first pair of input terminals energized by voltage of a line of said transmission system and a second pair of input terminals energized by a current of said line for providing periodic samples of said voltage and said current;

calculating means operatively connected to said sampling means and being effective to determine the existence of a fault in response to an onset of the fault somewhere in a section of said transmission system and to provide an initial set of fault assuming and no fault assuming estimates, said fault assuming and no fault assuming estimates including (A) cosine waveform state variable estimates respectively for said voltage and said current of the line subsequent to the onset of said fault, (B) negative sine waveform state variable estimates respectively for said voltage and said current of the line subsequent to the onset of said fault, and (C) at least one transient waveform state variable estimate for said no fault assuming current occurring subsequent to the onset of said fault, said calculating means further providing an updated set of said estimates of all of said state variables during a time period between each pair of consecutive ones of said periodic samples subsequent to the onset of said fault on a basis of a most nearly related previous sample of said voltage and a most nearly related previous sample of said current and a most nearly related previously provided set of said estimates, said calculating means being able to so provide an updated set of said estimates at least twice during the first half cycle after the onset of said fault, utilizing sampling data for computing said estimates of said voltage and said current subsequent to the onset of said fault;

said calculating means further being able to provide an updated probability $p(\alpha_1 Z_k)$ associated with the fault assuming and no fault assuming estimates and which may converge to a predetermined value to indicate a probability of a type of fault occurring in said transmission system;

said calculating means being effective in response to a convergence of calculated $p(\alpha_1 Z_k)$ probabilities to utilize cosine waveform state variable estimates and negative sine state variable estimates so updated in determining whether said fault is located in one section of said transmission system and to trip a circuit breaker means substantially only when said fault is determined to be located in said one section.

6. The distance relay claimed in claim 5 wherein said calculating means comprises processor means being effective to determine an existence of the fault, to provide said initial set of estimates and said updated set of estimates as to said voltage and current and to determine whether said fault is located in said one section and to trip said circuit breaker means.

7. An improved method for estimating phasor quantities, identifying a fault type and location, and distance protection of an electric power transmission line, which comprises of the steps of performing a fault detection routine which detects a disturbance on the transmission line, upon detection of a disturbance the method further comprises the steps of obtaining a line current value and a line to neutral voltage value of each phase of the transmission line, Adaptive Kalman filter schemes simultaneously processing said current and voltage values, each Adaptive Kalman filter scheme having at least two Adaptive Kalman filters, at least one Adaptive Kalman filter models a faulted condition and at least one Adaptive Kalman filter models an unfaulted condition, weight factors associated with each Adaptive Kalman filter and said weight factors identifying a probability related to a likelihood that a particular model corresponds to an actual condition of said transmission line, each of said Adaptive Kalman filters recursively simultaneously processing current and voltage values associated with each phase of said transmission line until weight factors associated with both the current and voltage Adaptive Kalman filters modeling a same condition attain a predetermined value, if said weight factors that attain the predetermined value are associated with the Adaptive Kalman filters modeling the unfaulted condition then said processing terminates and said fault detection routine commences, if said weight factors are associated with the Adaptive Kalman filters modeling the faulted phase then processing in said unfaulted and faulted Adaptive Kalman filter models not having a weight factor attaining a predetermined value discontinue processing, and the faulted phase is then identified, classified, a relay zone is determined, and a fault location is determined by utilizing both current and voltage data obtained from the Adaptive Kalman filter models associated with the weight factors which attained the predetermined value, and tripping circuit breaking means for a section of said transmission line corresponding to said relay zone.

* * * * *

UNITED STATES PATENT AND TRADEMARK OFFICE
CERTIFICATE OF CORRECTION

PATENT NO. : 4,812,995

DATED : March 14, 1989

INVENTOR(S) : Adly A. Girgis and Robert G. Brown

It is certified that error appears in the above—identified patent and that said Letters Patent is hereby corrected as shown below:

Column 10, line 64, $\dot{X}_k-$ should be $\hat{X}_k^-$

Column 10, line 65, $P_k-$ should be $P_k^-$

Column 11, line 1, $K_k = P_k^- H_k^T (H_k P_k^- H_k^T - R_k)^{-1}$ (9)

should be
$$K_k = P_k^- H_k^T (H_k P_k^- H_k^T + R_k)^{-1} \quad (9)$$

Column 11, line 5, $\dot{X}_k = \dot{X}_k^- + K_k(Z_k - H_k \dot{X}_k^-)$ (10)

should be
$$\hat{X}_k = \hat{X}_k^- + K_k (Z_k - H_k \hat{X}_k^-) \quad (10)$$

Column 11, line 10, $P_k = (I - K_k H_k) P_k^-$ (11)

should be
$$P_k = (I - K_k H_k) P_k^- \quad (11)$$

Column 11, line 64, $RIF_k = (\tfrac{1}{4}) \sigma^{if^2} e^{k\Delta t/T_1}$ (15)

should be
$$RIF_k = (1/4) \sigma_{if}^2 \cdot e^{k\Delta t/T_1} \quad (15)$$

UNITED STATES PATENT AND TRADEMARK OFFICE
CERTIFICATE OF CORRECTION

PATENT NO. : 4,812,995
DATED : March 14, 1989
INVENTOR(S) : Adly A. Girgis and Robert G. Brown It is certified that error appears in the above—identified patent and that said Letters Patent is hereby corrected as shown below:

Column 12, line 4, $RIU_k = \sigma_{iu}^2 \cdot e^{-k\Delta t/T_1}$ (16)

should be $$RIU_k = \sigma_{Iu}^2 \cdot e^{-k\Delta t/T_1} \quad (16)$$

Column 12, line 7, $\sigma_{if}^2$ should be $\sigma_{If}^2$

Column 12, line 9, $\sigma_{iu}^2$ should be $\sigma_{Iu}^2$

Column 12, line 20, $RVF_k = \sigma_{vf}^2 \cdot \sigma e^{-k\Delta t/T_1}$ (17)

should be $$RVF_k = \sigma_{Vf}^2 \cdot \sigma e^{-k\Delta t/T_1} \quad (17)$$

Column 12, line 23, $RVU_k = \sigma_{vu}^2 \cdot \sigma e^{-k\Delta t/T_1}$ (18)

should be $$RVU_k = \sigma_{Vu}^2 \cdot \sigma e^{-k\Delta t/T_1} \quad (18)$$

Column 12, line 26, $\sigma_{vf}^2$ should be $\sigma_{Vf}^2$

Column 12, line 28, $\sigma_{vu}^2$ should be $\sigma_{Vu}^2$

Column 12, line 52, $l$ should be $\lambda$

UNITED STATES PATENT AND TRADEMARK OFFICE
CERTIFICATE OF CORRECTION

PATENT NO. : 4,812,995

DATED : March 14, 1989

INVENTOR(S) : Adly A. Girgis and Robert G. Brown

It is certified that error appears in the above—identified patent and that said Letters Patent is hereby corrected as shown below:

Column 14, line 27, $\hat{x}_{ovf}^{-} = C_o \text{ prefault voltage}$ (24)

should be $$\hat{x}_{ovf}^{-} = C_o \cdot \text{prefault voltage} \tag{24}$$

Column 14, line 47, $\hat{x}_{ovu}^{-} = \text{prefault voltage vector}$ (26)

should be $$\hat{x}_{ovu}^{-} = \text{prefault voltage vector} \tag{26}$$

Column 15, line 47, $\hat{x}_{oif}^{-}(1,2) = I_{scm}\underline{/\theta_v - \pi/3}$ (32)

should be $$\hat{x}_{oif}^{-}(1,2) = I_{scm}\underline{/\theta_v - \pi/3} \tag{32}$$

Column 15, line 55, $\hat{x}_{oif}^{-}(3) = -\hat{x}_{oif}^{-}(1)$ (33)

should be $$\hat{x}_{oif}^{-}(3) = -\hat{x}_{oif}^{-}(1) \tag{33}$$

Column 16, line 13, $\dot{x}_o -$ should be $\hat{x}_o^{-}$

Column 16, line 40, $(z_k - H_k \dot{x}_k -)$ should be $(z_k - H_k \hat{x}_k^{-})$ Column 16, line 43, $(z_k - \dot{z}_k -)$ should be $(z_k - \hat{z}_k^{-})$

UNITED STATES PATENT AND TRADEMARK OFFICE
CERTIFICATE OF CORRECTION

PATENT NO. : 4,812,995
DATED : March 14, 1989
INVENTOR(S) : Adly A. Girgis and Robert G. Brown It is certified that error appears in the above—identified patent and that said Letters Patent is hereby corrected as shown below:

Column 16, line 59, $$p(z_k|a_i) = \left\{ \frac{1}{(2\pi)^{\frac{1}{2}}(H_k P_k^- H_k^T + R_k)^{\frac{1}{2}}} \exp\left[-\frac{1}{2} \frac{(z_k - \hat{z}_k^-)}{(H_k P_k^- H_k^T + R_k)}\right] \right\} p(z_{k-1}|a_i); i = 1,2 \quad (36)$$

should be $$p(z_k|a_i) = \{ \frac{1}{(2\pi)^{1/2}(H_k P_k^- H_k^T + R_k)^{1/2}} \exp\{-1/2 \frac{(z_k - \hat{z}_k^-)^2}{(H_k P_k^- H_k^T + R_k)}\}\} \, p(z_{k-1}|a_i); \, i=1,2 \quad (36)$$

Column 17, line 6, $(z_k - \hat{z}_k^-)$ should be $(z_k - \hat{z}_k^-)$

Column 17, line 6, $(H_k P_k^- H_k + R_k)$ should be $(H_k P_k^- H_k + R_k)$

UNITED STATES PATENT AND TRADEMARK OFFICE
CERTIFICATE OF CORRECTION

PATENT NO. : 4,812,995

DATED : March 14, 1989

INVENTOR(S) : Adly A. Girgis and Robert G. Brown

Page 5 of 5

It is certified that error appears in the above-identified patent and that said Letters Patent is hereby corrected as shown below:

Column 20, line 17, $$= \frac{V_1 \cdot I_{s1} - V_2 \cdot I_{s2}}{I_{sm}^2} - j \frac{V_1 \cdot I_{s2} - V_2 \cdot I_{s1}}{I_{sm}^2} \quad (42)$$

$$\text{where } I_{sm}^2 = I_{s1} \cdot I_{s1} - I_{s2} \cdot I_{s2}$$

should be $$= \frac{V_1 \cdot I_{s1} + V_2 \cdot I_{s2}}{I_{sm}^2} + j - \frac{V_1 \cdot I_{s2} + V_2 \cdot I_{s1}}{I_{sm}^2} \quad (42)$$

$$\text{where } I_{sm}^2 = I_{s1} \cdot I_{s1} + I_{s2} \cdot I_{s2}$$

Column 21, line 7, $$\begin{bmatrix} R_{app} \\ X_{app} \end{bmatrix} = \begin{bmatrix} R_1 & (I_d I_{s1} - I_q I_{s2})/I_{sm}^2 \\ X_1 & (I_d I_{s2} + I_q I_{s1})/I_{sm}^2 \end{bmatrix} \begin{bmatrix} x \\ K_F R_F \end{bmatrix} \quad (44)$$

should be $$\begin{bmatrix} R_{app} \\ X_{app} \end{bmatrix} = \begin{bmatrix} R_1 & (I_d I_{s1} - I_q I_{s2})/I_{sm}^2 \\ X_1 & (I_d I_{s2} + I_q I_{s1})/I_{sm}^2 \end{bmatrix} \begin{bmatrix} x \\ K_F R_F \end{bmatrix} \quad (44)$$

Signed and Sealed this

Third Day of April, 1990

Attest:

HARRY F. MANBECK, JR.

Attesting Officer

Commissioner of Patents and Trademarks